(12) United States Patent
Kondo et al.

(10) Patent No.: US 8,159,527 B2
(45) Date of Patent: Apr. 17, 2012

(54) METHOD OF DISPLAYING PICTURES, PROGRAM FOR DISPLAYING PICTURES, RECORDING MEDIUM HOLDING THE PROGRAM, AND DISPLAY UNIT

(75) Inventors: Tetsujiro Kondo, Tokyo (JP); Tsuyoshi Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1439 days.

(21) Appl. No.: 11/503,841

(22) Filed: Aug. 14, 2006

(65) Prior Publication Data

US 2007/0040904 A1    Feb. 22, 2007

(30) Foreign Application Priority Data

Aug. 16, 2005   (JP) ................. P2005-236034

(51) Int. Cl.
   *H04N 13/00* (2006.01)
(52) U.S. Cl. ................. 348/51; 348/42; 348/52
(58) Field of Classification Search ......... 348/42, 348/43, 51–60, 94, 95, 699; 352/86; 345/6; 359/462; 382/100, 154
See application file for complete search history.

(56) References Cited

U.S. PATENT DOCUMENTS

| | | | | |
|---|---|---|---|---|
| 4,393,400 A * | 7/1983 | Ikushima et al. | | 348/56 |
| 5,581,625 A * | 12/1996 | Connell | | 382/100 |
| 6,940,473 B2 * | 9/2005 | Suyama et al. | | 345/6 |
| 2001/0045979 A1 * | 11/2001 | Matsumoto et al. | | 348/43 |
| 2006/0050383 A1 * | 3/2006 | Takemoto et al. | | 359/462 |
| 2006/0132597 A1 * | 6/2006 | Mashitani et al. | | 348/51 |
| 2006/0204075 A1 * | 9/2006 | Mashitani et al. | | 382/154 |

FOREIGN PATENT DOCUMENTS

| | | |
|---|---|---|
| JP | 64 78285 | 3/1989 |
| JP | 7 296185 | 11/1995 |
| JP | 10 333093 | 12/1998 |
| JP | 2005 65051 | 3/2005 |
| JP | 4461834 | 2/2010 |

* cited by examiner

*Primary Examiner* — Joseph Ustaris
*Assistant Examiner* — Hang Gao
(74) *Attorney, Agent, or Firm* — Frommer Lawrence & Haug LLP; William S. Frommer; Thomas F. Presson

(57) ABSTRACT

At least one picture is shown on a plurality of displays according to the distance from a user to an object. Picture signals are classified based on depth values of pictures, a plurality of displays are chosen based on the classification, and the pictures are shown on the chosen displays in the form of moving pictures.

14 Claims, 25 Drawing Sheets

FIG. 10A

| AREA OF OBJECT | DEPTH VALUE |
|---|---|
| S1-S2 | D1 |
| S2-S3 | D2 |
| S3-S4 | D3 |
| ⋮ | ⋮ |

FIG. 10B

| BUST SHOT/ CLOSE-UP | DEPTH VALUE |
|---|---|
| 1 (DETECTION) | D1 |

FIG. 10C

| COEFFICIENT OF CORRELATION AMONG COLOR HISTOGRAMS | DEPTH VALUE |
|---|---|
| C1-C2 | D1 |
| C2-C3 | D2 |
| C3-C4 | D3 |
| ⋮ | ⋮ |

A

A

A

A

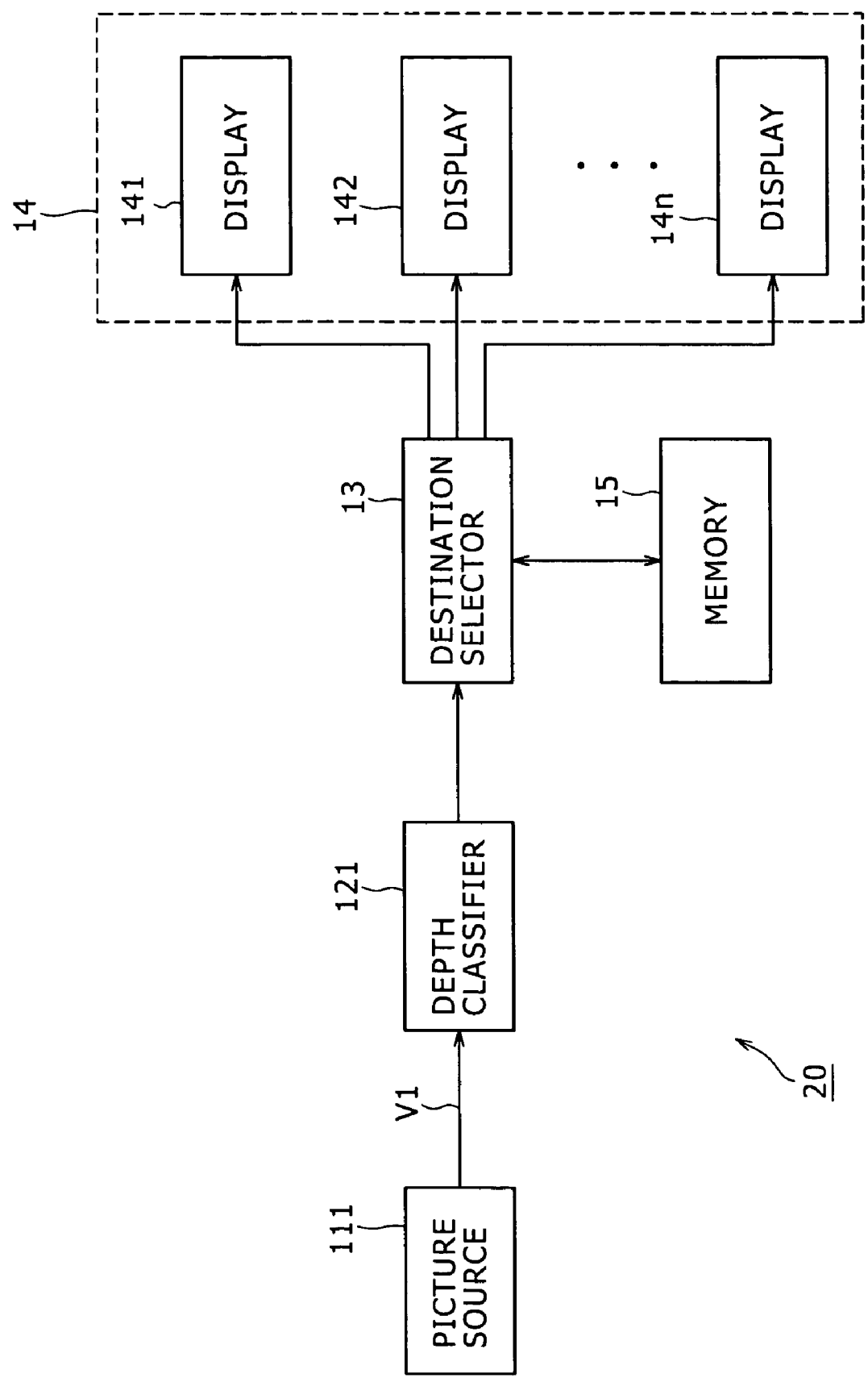

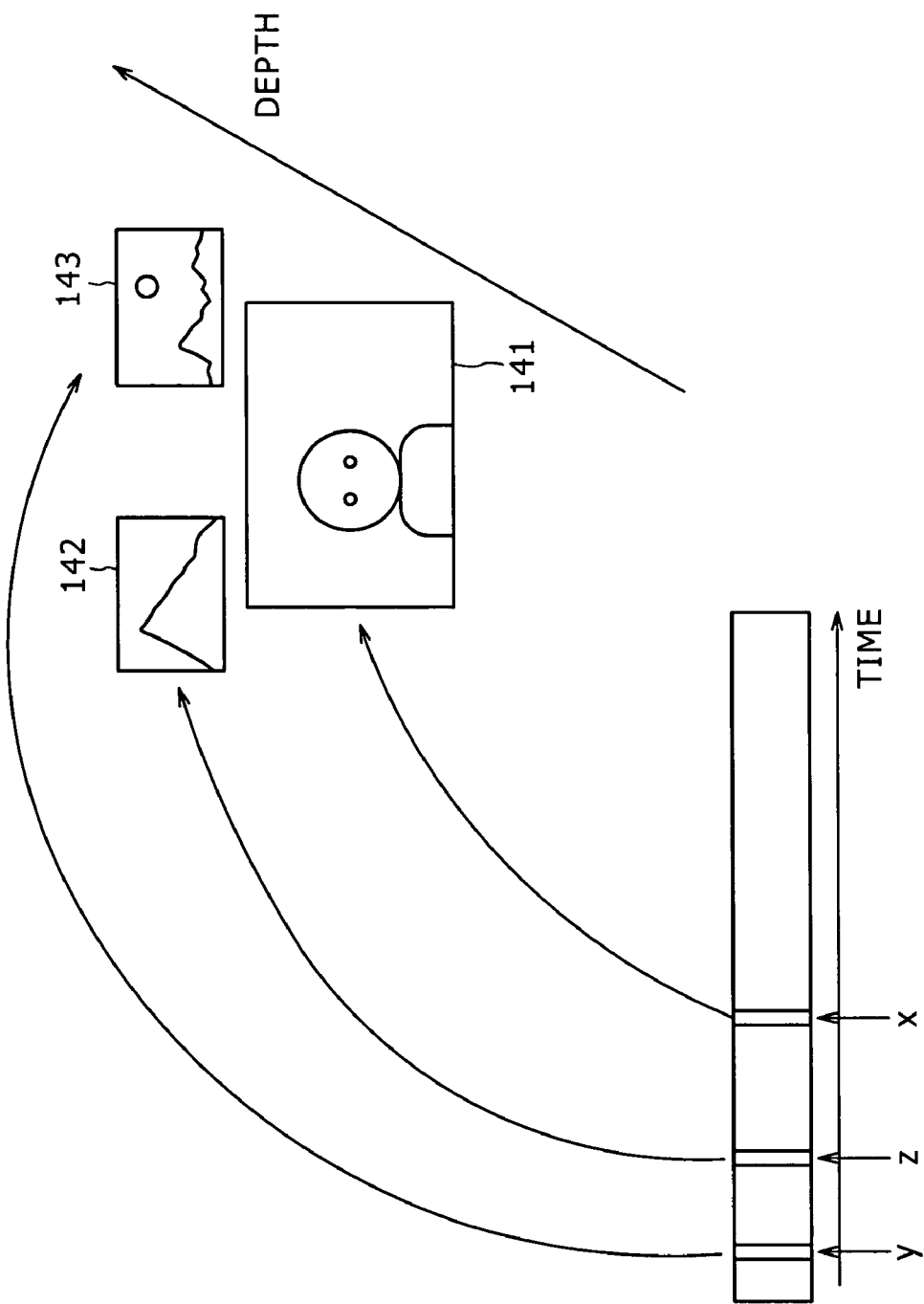

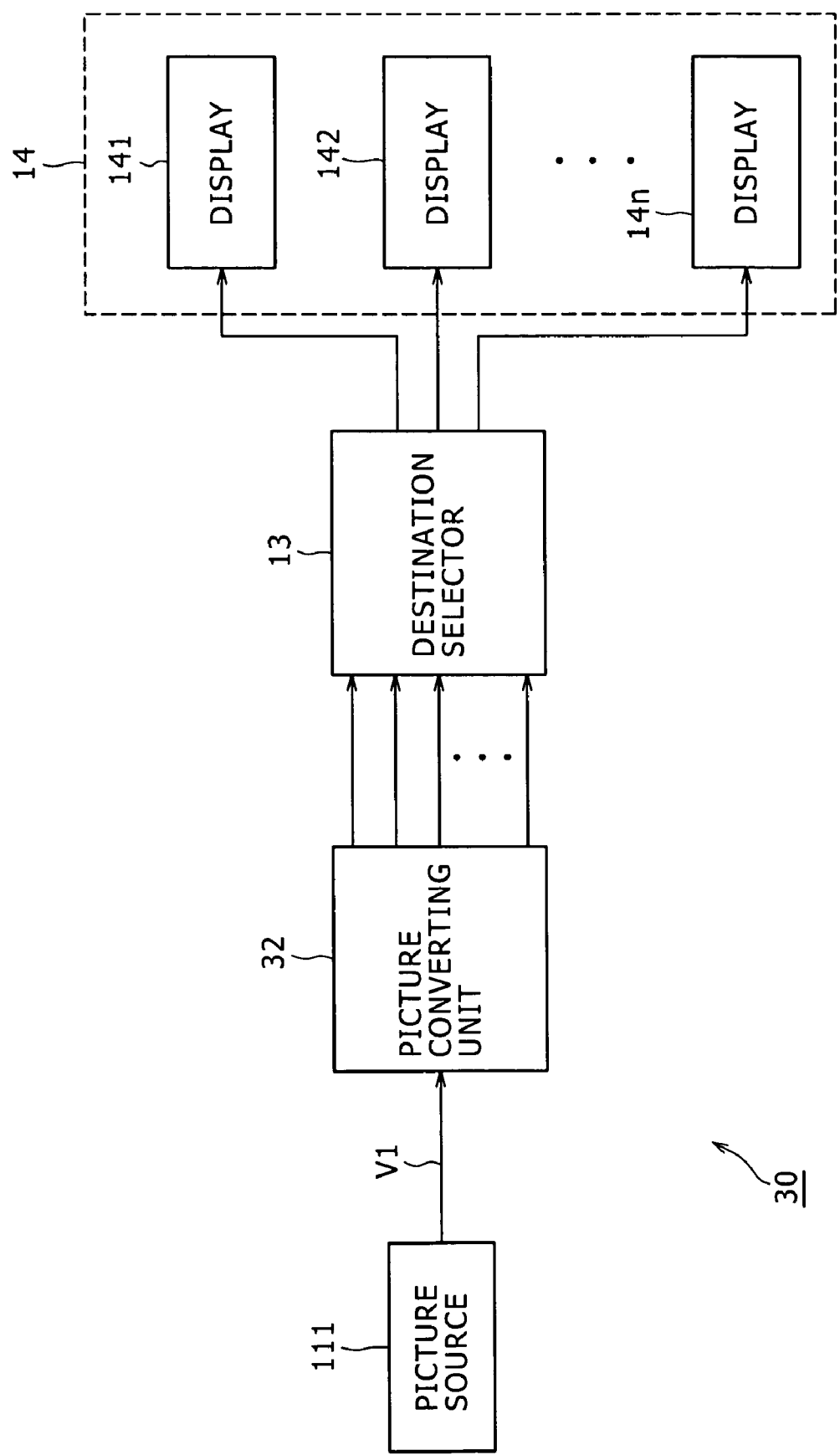

F I G. 2 2
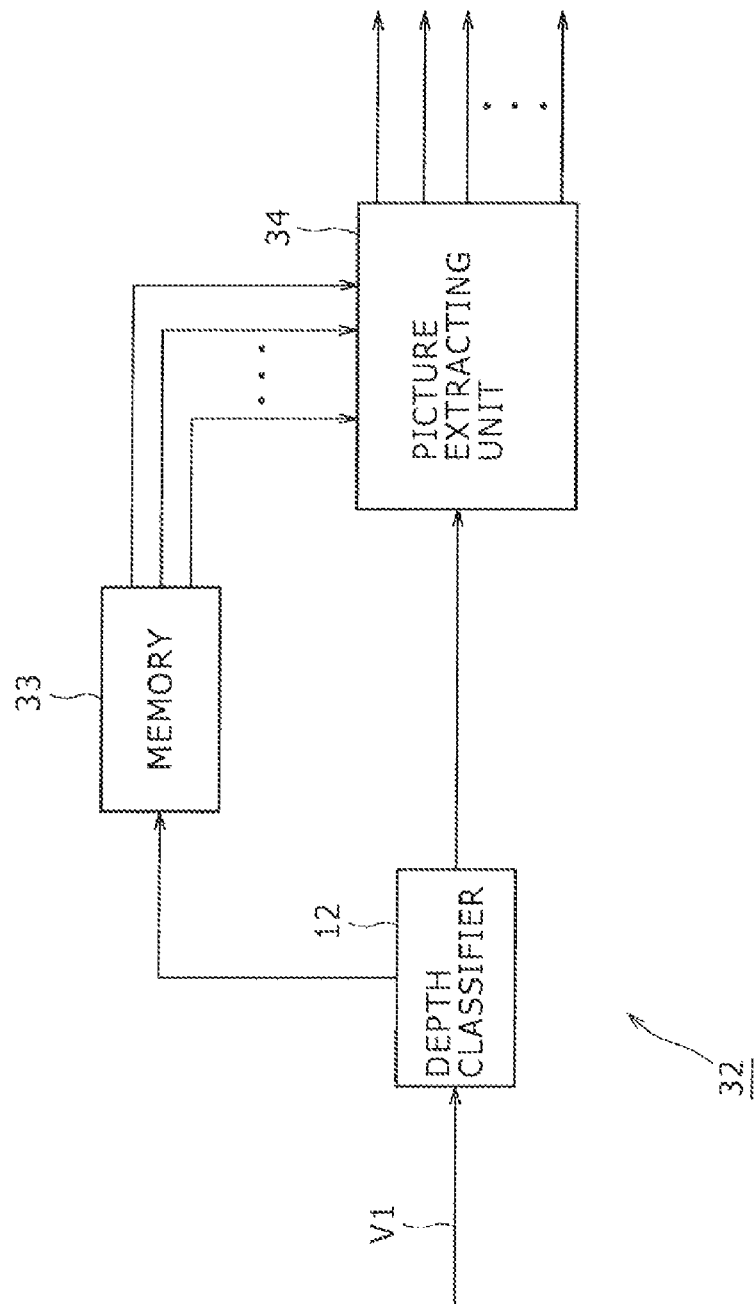

FIG.26
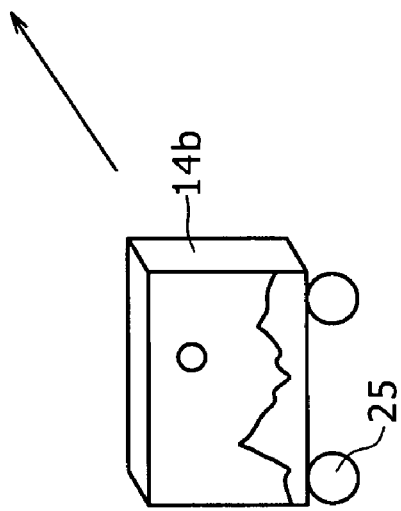
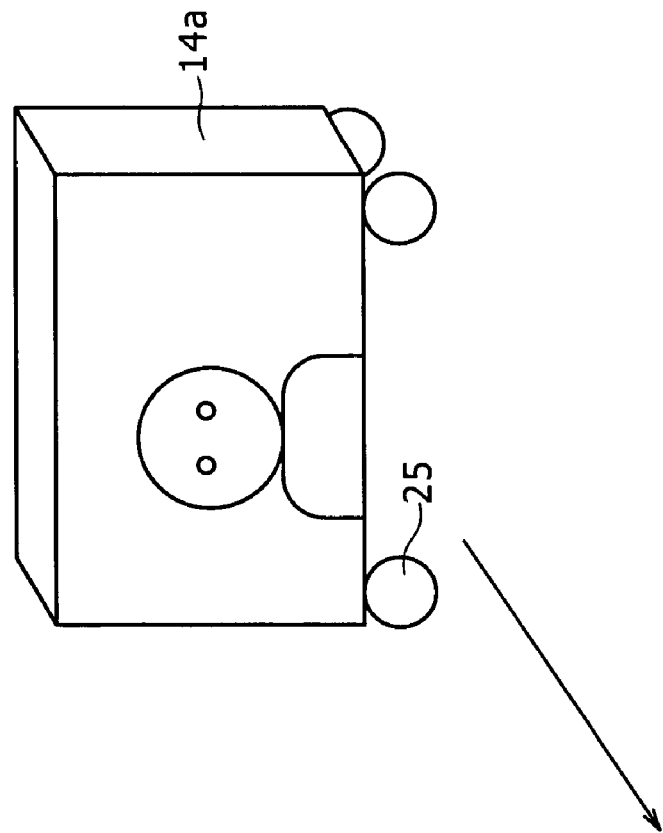

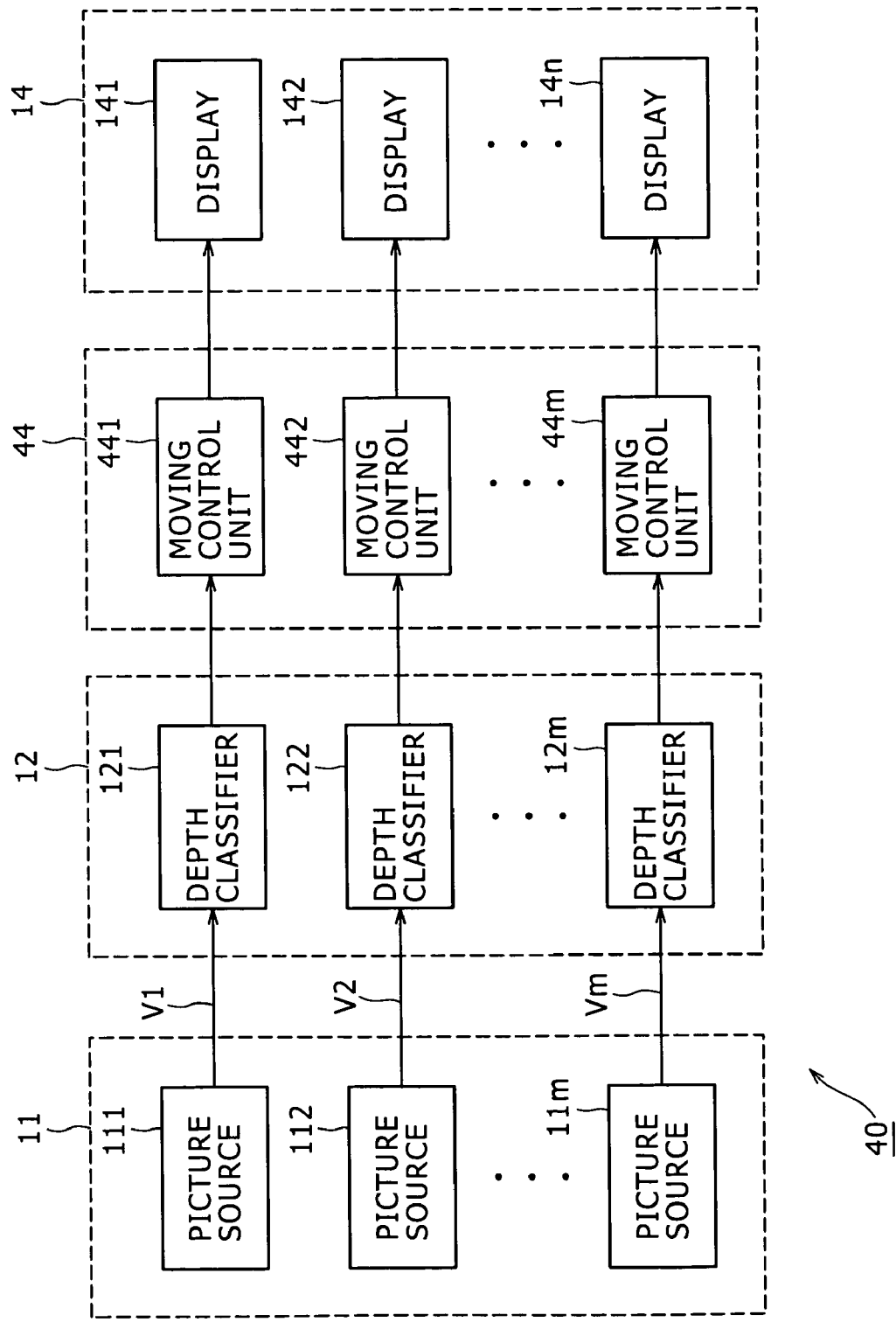

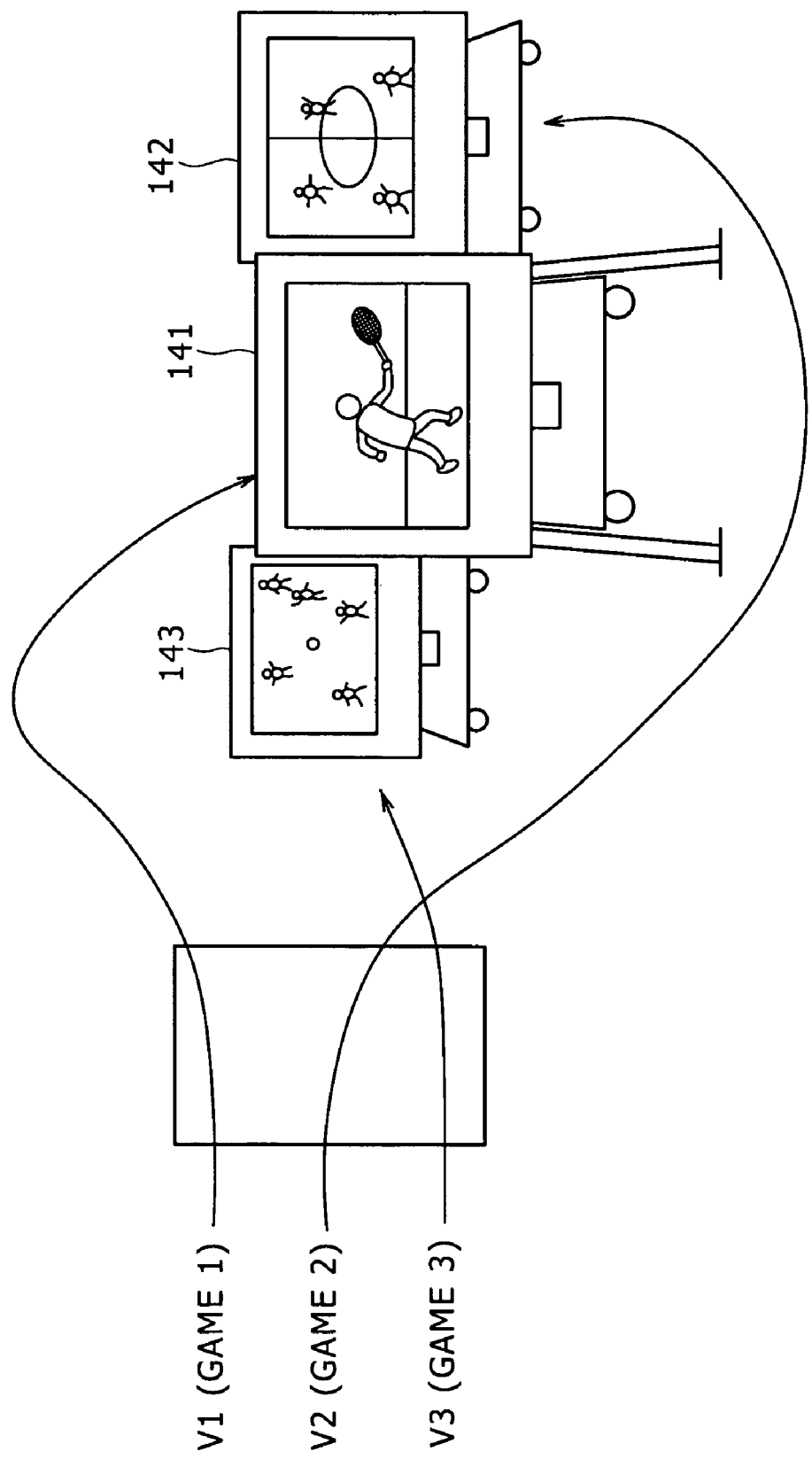

METHOD OF DISPLAYING PICTURES, PROGRAM FOR DISPLAYING PICTURES, RECORDING MEDIUM HOLDING THE PROGRAM, AND DISPLAY UNIT

CROSS REFERENCE TO RELATED APPLICATIONS

The present invention contains subject matter related to Japanese Patent Application JP 2005-236034 filed in the Japanese Patent Office on Aug. 16, 2005, the entire contents of which being incorporated herein by reference.

BACKGROUND OF THE INVENTION

1. Field of the Invention

The present invention relates to a method of displaying pictures, a program for displaying pictures, a recording medium holding the program, and a display unit, all the method, program, medium, and unit being suitable for the enhancement of our feelings as if we were in real scenes when we watch programs provided on TV etc.

2. Description of the Related Art

Various methods of processing picture signals to improve our feelings as if we were in real scenes when we watch programs provided on TV etc. have been proposed so far. For example, disclosed in Japanese Patent Unexamined Publication No. Hei 9-81746 is a method of detecting, from pictures, the distance to an object and processing picture signals on the basis of the detected distance and in accordance with the movement of the user's viewpoint.

Incidentally, in one's real life, the focal point of one's eye changes as one's viewpoint moves and, hence, one can continue to focus on an object at changing distance. Besides, one can perceive the changing distance to the object from the change of focal distance of one's eyes and three-dimensional view through one's both eyes.

On the other hand, some programs on TV include both near and far scenes, but any scene is shown on a display unit at a fixed distance from the viewer.

SUMMARY OF THE INVENTION

As described above, the related art fails to provide viewers of programs provided on TV etc. with such perspective, or depth perception, as they have in their real life; therefore, it is difficult for the viewers to feel as if they were in real scenes when they watch such programs.

In view of the above problem, there is a need for providing a method of displaying pictures, a program for displaying pictures, a recording medium holding the program, and a display unit, all the method, program, medium, and unit being capable of enhancing our feelings as if we were in real scenes when we watch programs provided on TV etc.

According to an embodiment of the present invention, there is provided a method of classifying picture signals based on the depth values of the pictures, choosing a plurality of displays arranged at different distances from the user based on the classification, and displaying the pictures of at least one picture signal in the form of moving pictures on the chosen displays.

According to an embodiment of the present invention, there is provided another method of dividing the picture of a picture signal into pictures with time domains based on the above classification and repeatedly reproducing one of the pictures with a time domain different from the time domain of the inputted picture.

According to an embodiment of the present invention, the depth values of the pictures of the above classified picture signals are compared and displays on which the pictures are to be shown are chosen based on the result of the comparison.

According to an embodiment of the present invention, there is provided still another method of classifying picture signals based on the depth values of the pictures, displaying the pictures of the classified picture signals on a plurality of displays, and moving the displays in accordance with the depth values of the pictures.

According to an embodiment of the present invention, our feelings as if we were in real scenes when we watch programs provided on TV etc. can be enhanced.

BRIEF DESCRIPTION OF THE DRAWINGS

Embodiments of the present invention will be described in detail based on the following figures, wherein:

FIG. 10 shows tables for defining values of characteristics and depth values;

FIG. 19 is a block diagram of a display system according to an embodiment of the present embodiment;

FIG. 20 shows an example wherein an inputted picture and pictures whose positions are different from that of the inputted picture in a time sequence are reproduced;

FIG. 21 is a block diagram of a display system according to an embodiment of the present invention;

FIG. 22 is a block diagram of a picture converting unit;

FIG. 26 shows displays provided with moving mechanisms;

FIG. 27 is a block diagram showing a display system according to an embodiment of the present invention; and FIG. 28 shows displays provided with moving mechanisms.

DESCRIPTION OF THE PREFERRED EMBODIMENTS

By referring to the attached drawings, preferred embodiments of the display system of the present invention will be described bellow.

Figure 1:
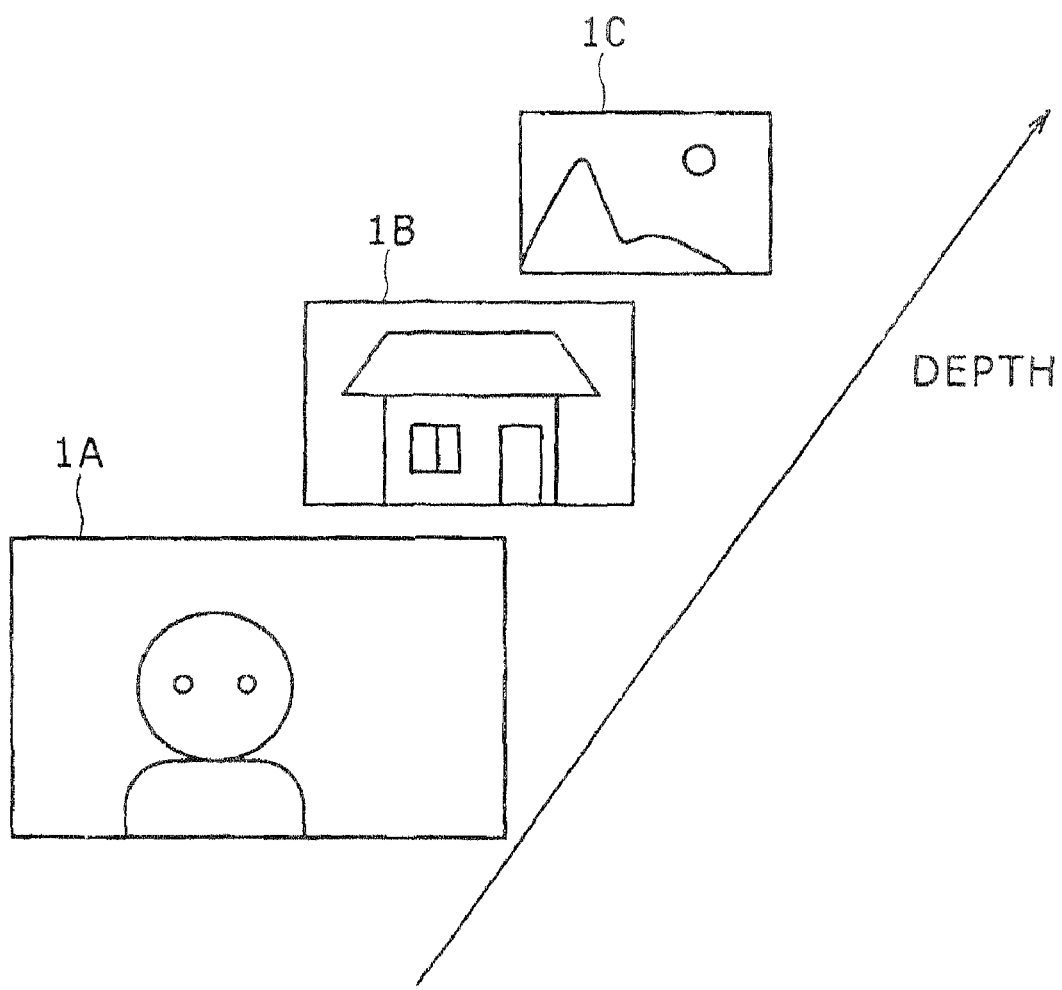
FIG. 1 shows that pictures are displayed on a plurality of displays arranged at different distances from a user.
Figure 2B:
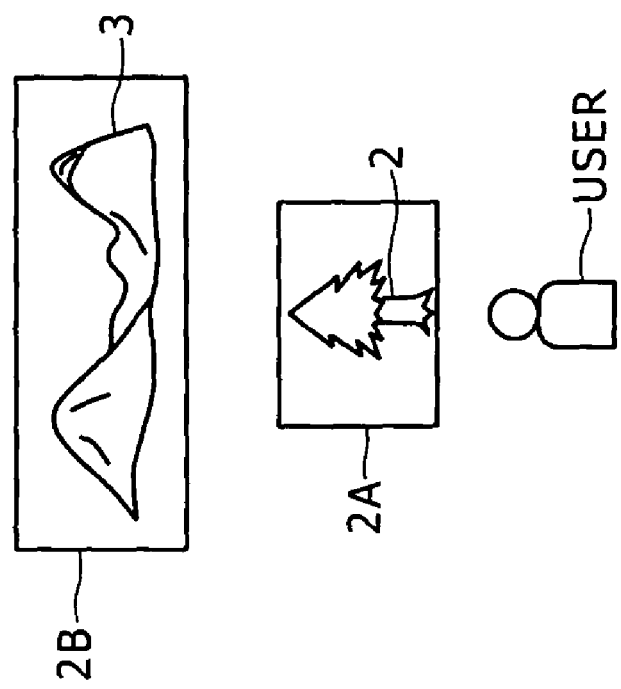
FIG. 2B shows the positional relationship between the user and a plurality of displays on which the objects are shown.
Figure 2A:
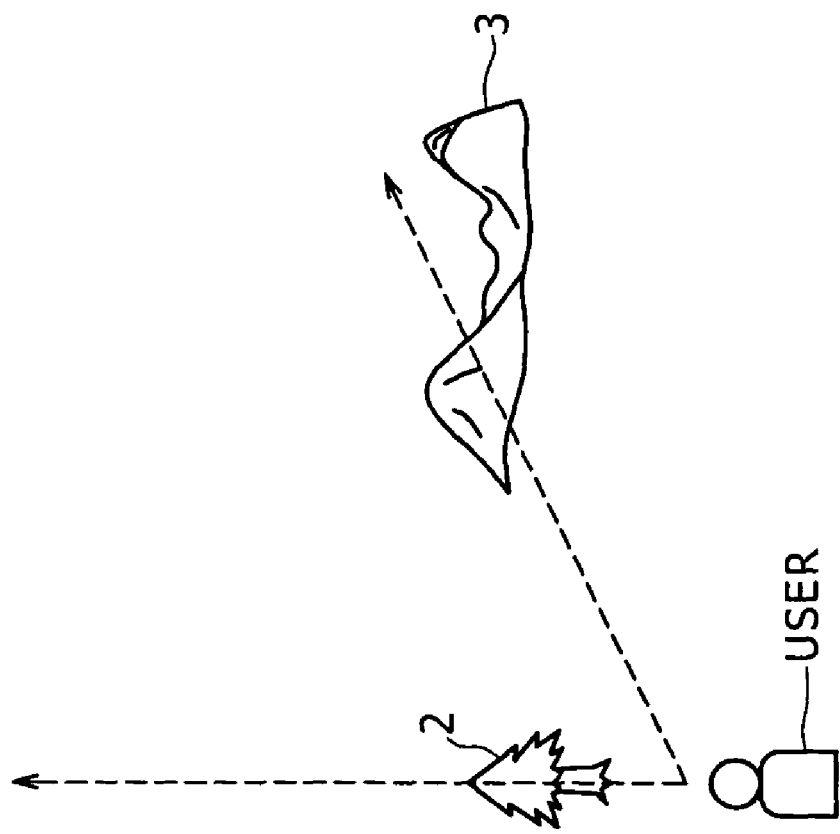
FIG. 2A shows the positional relationship between a user and two objects in the real world.

The display system according to an embodiment of the present invention estimates the depth values of pictures based on picture signals, classifies pictures based on the estimated depth values, and shows the pictures of different depth values on displays 1A, 1B, and 1C arranged at different distances from the user as shown in FIG. 1. For example, even if an object 3 does not exist behind an object 2 as seen by a user as shown in FIG. 2A, the display system is capable of having the user see the object 3 situated behind the object 2 at the same time and feel as if he or she were in the real scene by showing the object 2 small on a near display 2A and the object 3 large on a far display 2B disposed behind the near display 2A as shown in FIG. 2B.

Figure 3:
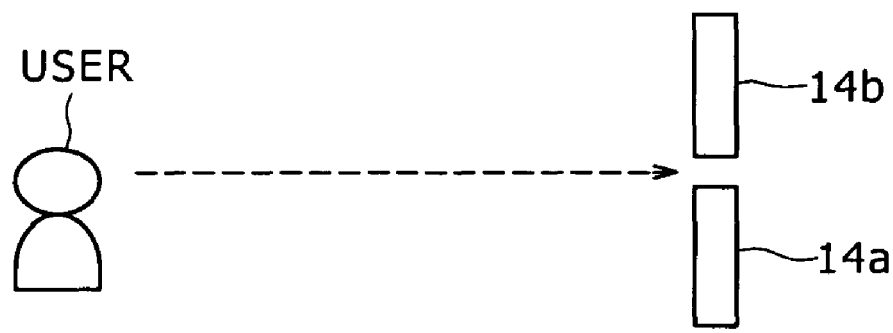
FIG. 3 shows an example wherein two displays are arranged sideways.
Figure 4:
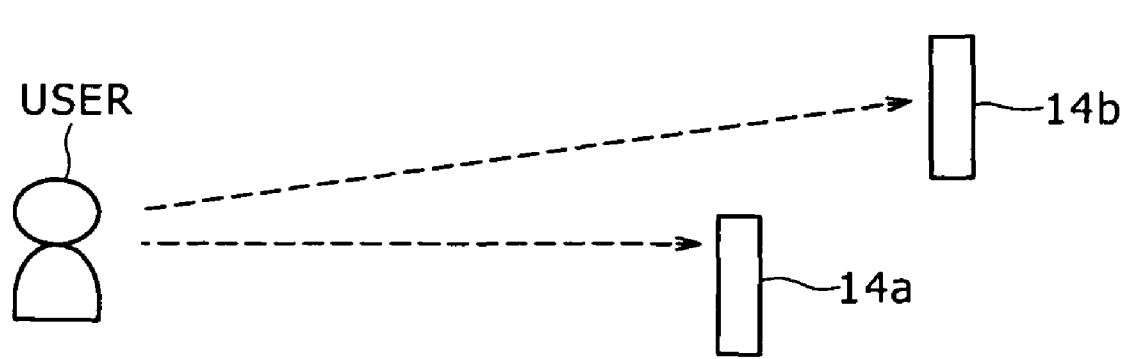
FIG. 4 shows that one display is put behind another display.

If two displays 14a and 14b are put at the same distance from a user as shown in FIG. 3, the user's eyes may be focused on the two displays 14a and 14b simultaneously. On the other hand, if the display 14b is put behind the display 14a as shown in FIG. 4, the user's eyes can be focused on only one display 14a or 14b at a time. Thus, perspective, or depth perception, because of the change of focal distance of the user's eyes and perspective because of three-dimensional view through both the user's eyes have the user feel as if he or she were in the real scene.

Figure 5:
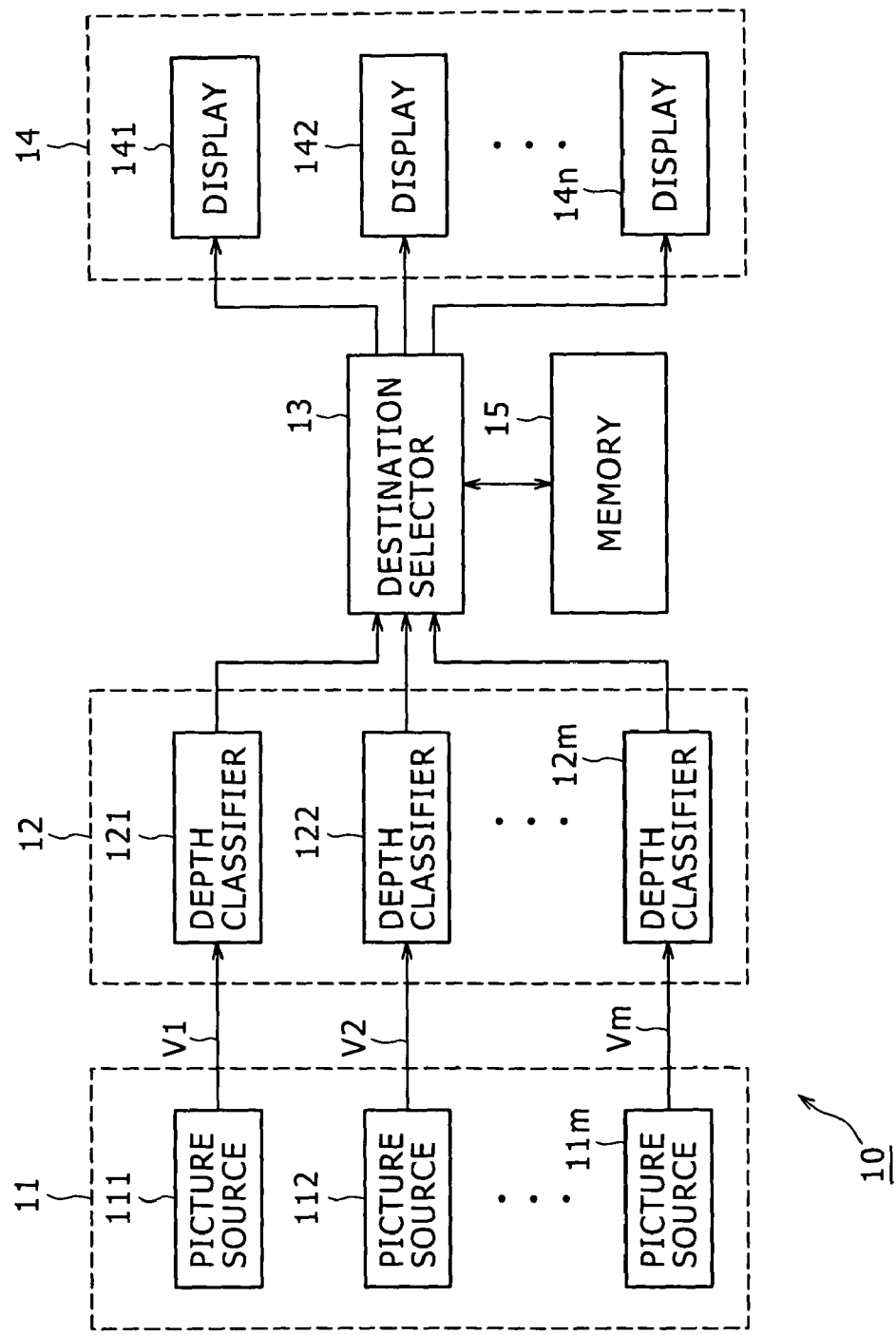
FIG. 5 is a block diagram of a display system according to an embodiment of the present invention.

FIG. 5 is a block diagram of the display system according to a first embodiment of the present invention. The display system 10 includes a plurality of picture sources 11 (picture source 111, 112, . . . , 11m), a plurality of depth classifiers 12 (depth classifier 121, 122 . . . , 12m), a destination selector 13, a plurality of displays 14 (display 141, 142, . . . , 14n), and a memory 15. The reference letter "m" is the number of picture sources; "n," the number of displays.

The picture sources 11 are, for example, TV tuners, DVD (Digital Versatile Disc) players, video tape recorders, and so on. With the above construction, the display system 10 provides users with various picture contents supplied from the picture sources 11.

Figure 6:
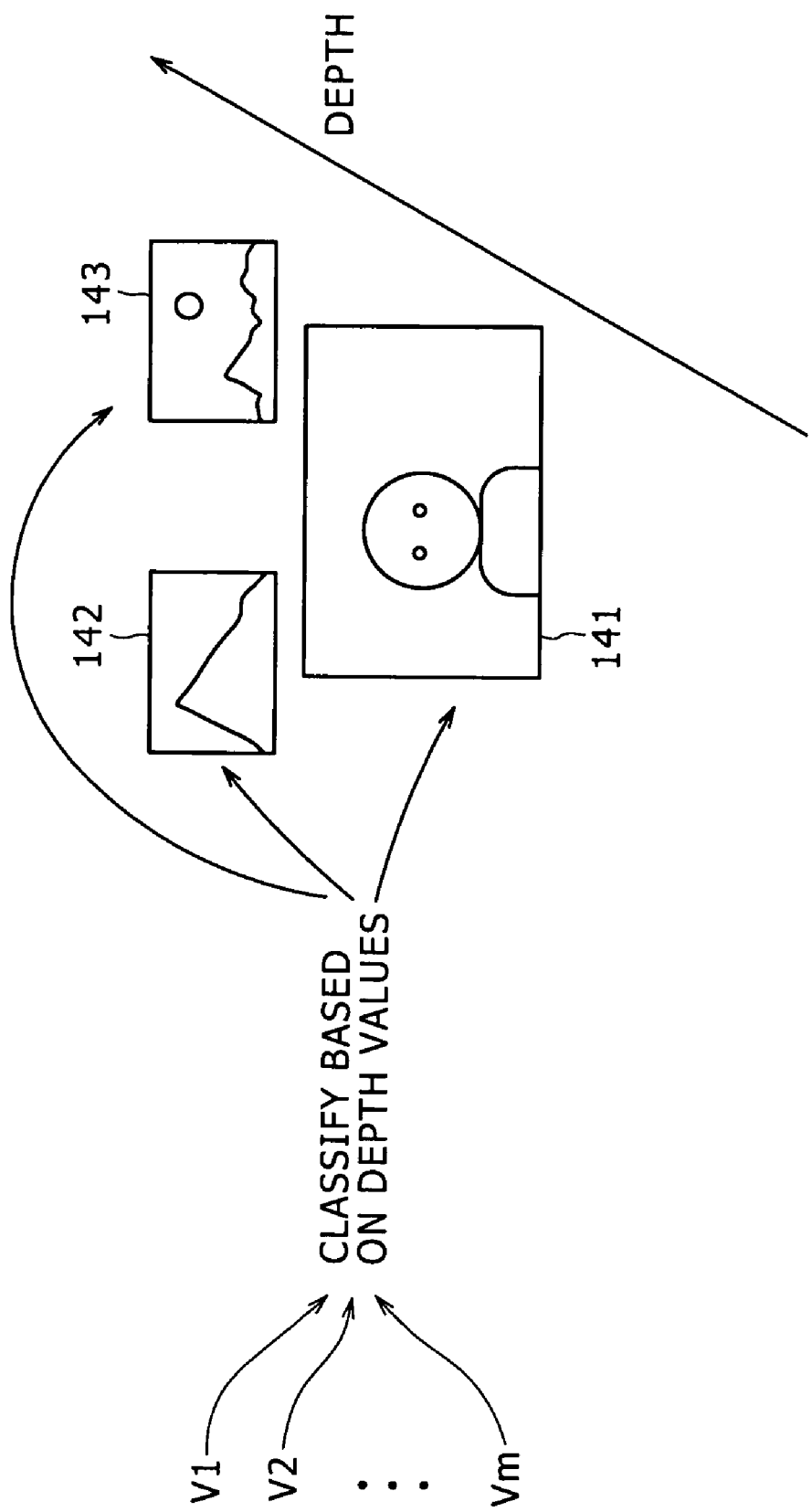
FIG. 6 shows that a plurality of pictures are displayed on a plurality of displays.

As shown in FIG. 6, the display system 10 classifies picture signals V1, V2, . . . , Vm based on the depth values of pictures and the smaller the depth value of the picture is, the smaller the number of the display on which the picture is shown.

Figure 7:
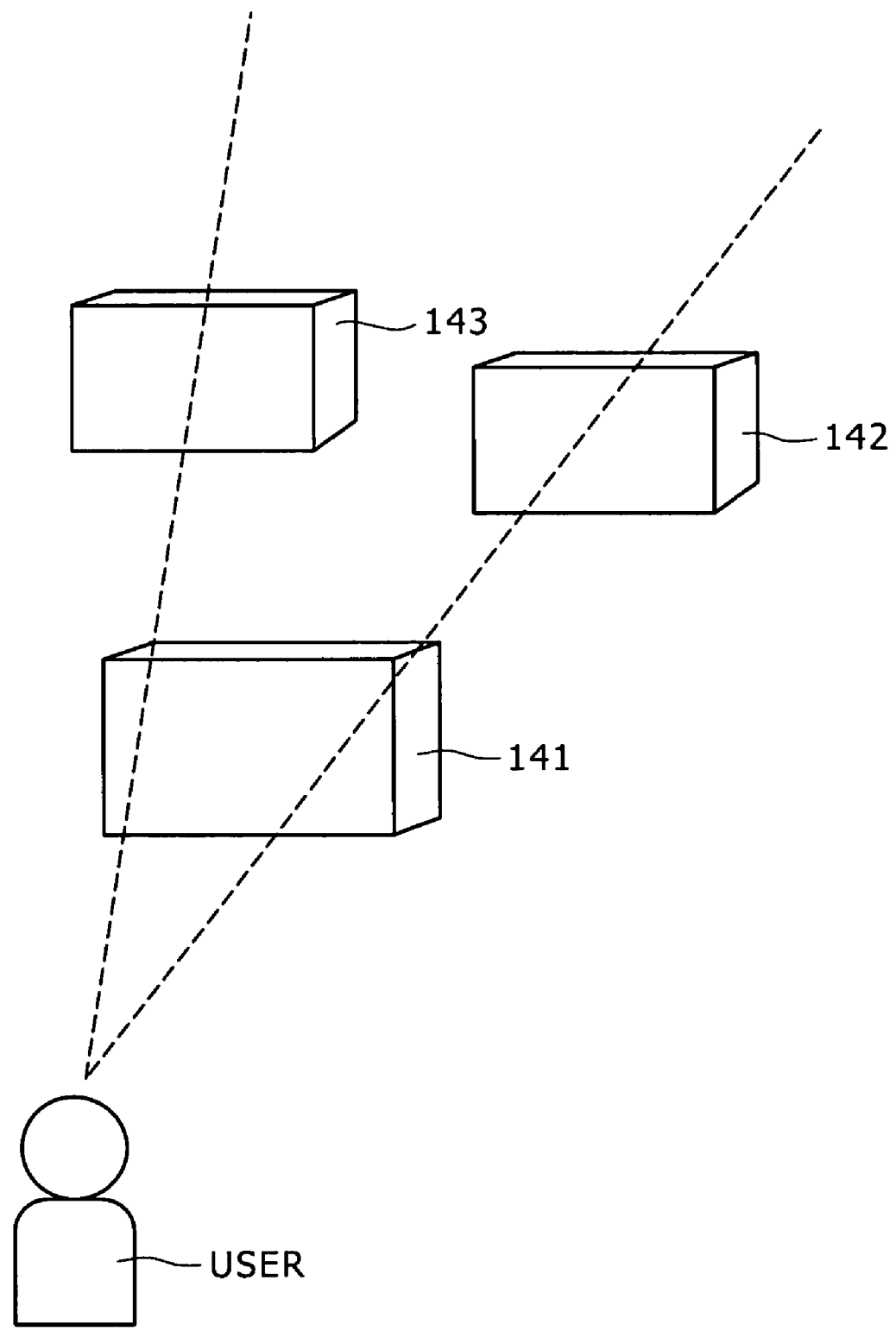
FIG. 7 shows how a plurality of displays are arranged in the display system.

As shown in FIG. 7, the user can see all the displays 141, 142, . . . , 14n which are arranged in that order from the front to the rear so that the user's view will widen toward the rear and on which the pictures from the picture sources 11 are selectively shown in the form of moving pictures as described above. The depth classifiers 12 estimate the depth values of pictures based on the values of characteristics of the pictures.

Figure 8:
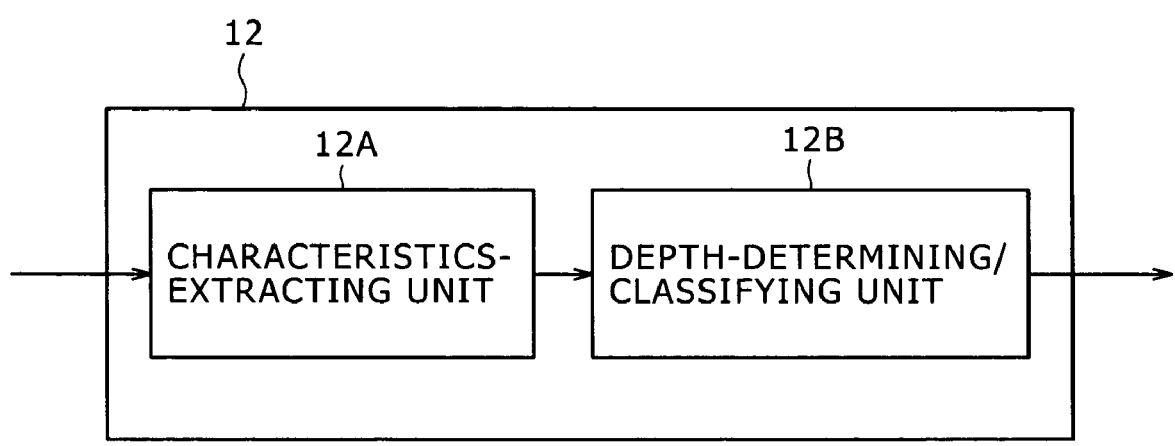
FIG. 8 is a block diagram of a depth classifier.

As shown in FIG. 8, each depth classifier 12 includes a characteristics-extracting unit 12A and a depth-determining/classifying unit 12B.

Figure 9:
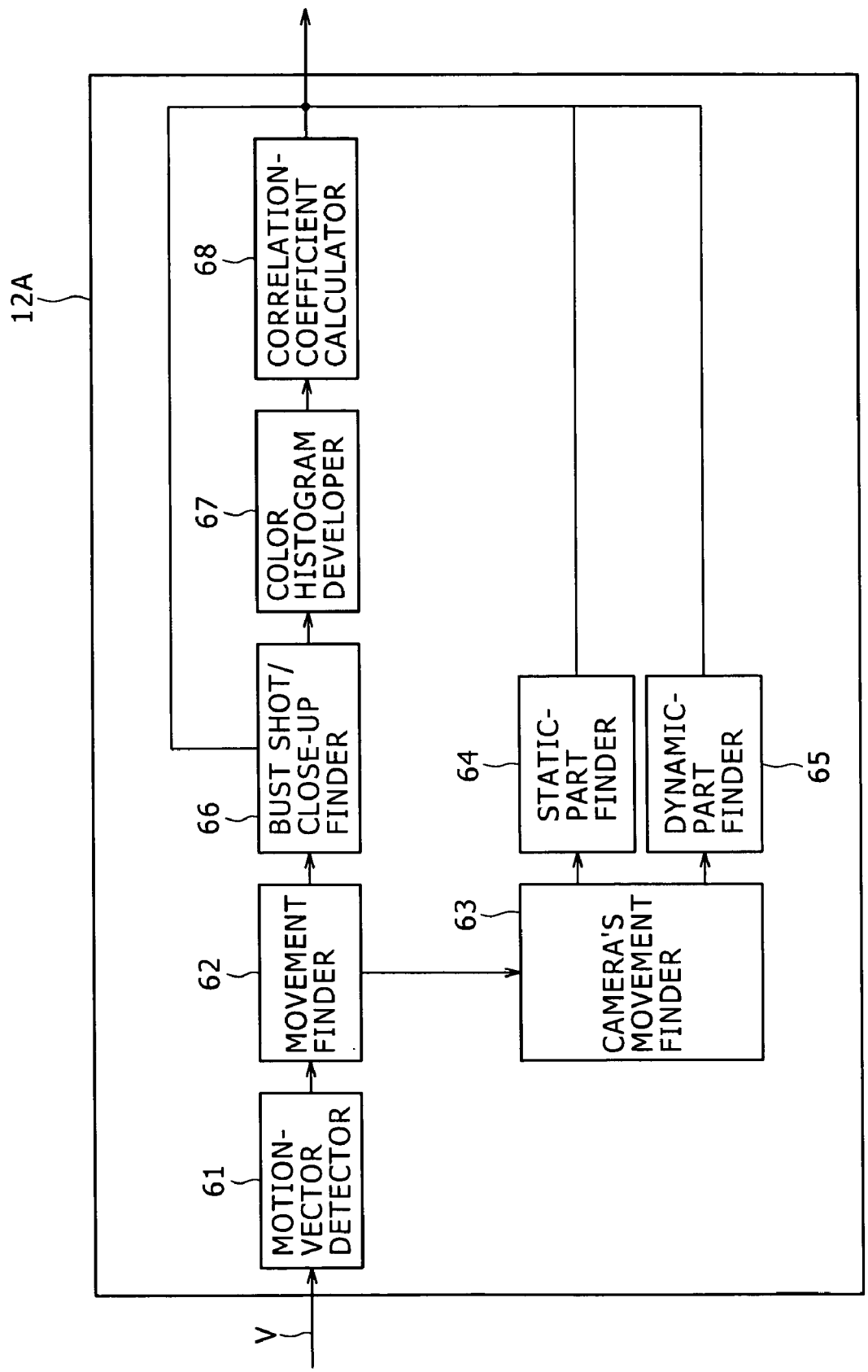
FIG. 9 is a block diagram of a characteristics-extracting unit.

As shown in FIG. 9, the characteristics-extracting unit 12A includes (i) a motion-vector detector 61 to detect motion vectors in the picture of a picture signal V, (ii) a movement finder 62 to find movement based on the motion vectors, (iii) a camera's movement finder 63 to determine whether the movement is due to the movement of the camera or not, when the movement finder 62 finds movement, (iv) a static-part finder 64 to find static parts and calculate their area if the movement is due to the camera's movement, and (v) a dynamic-part finder 65 to find dynamic parts and calculate their area if the movement is not due to the camera's movement. The characteristics-extracting unit 12A further includes (i) abust shot/close-up finder 66 to determine whether or not the picture is a bust shot or a close-up when the movement finder 62 finds no movement, (ii) a color histogram developer 67 to divide the picture into sections and make a color histogram for each section when the bust shot/close-up finder 66 finds that the picture is not a bust shot or a close-up, and (iii) a correlation-coefficient calculator 68 to calculate the coefficient of correlation among the color histograms.

The depth-determining/classifying unit 12B uses the depth-defining tables shown in FIG. 10 to determine the depth values of pictures based on the above values of characteristics and classify the pictures based on their depth values.

Figure 11:
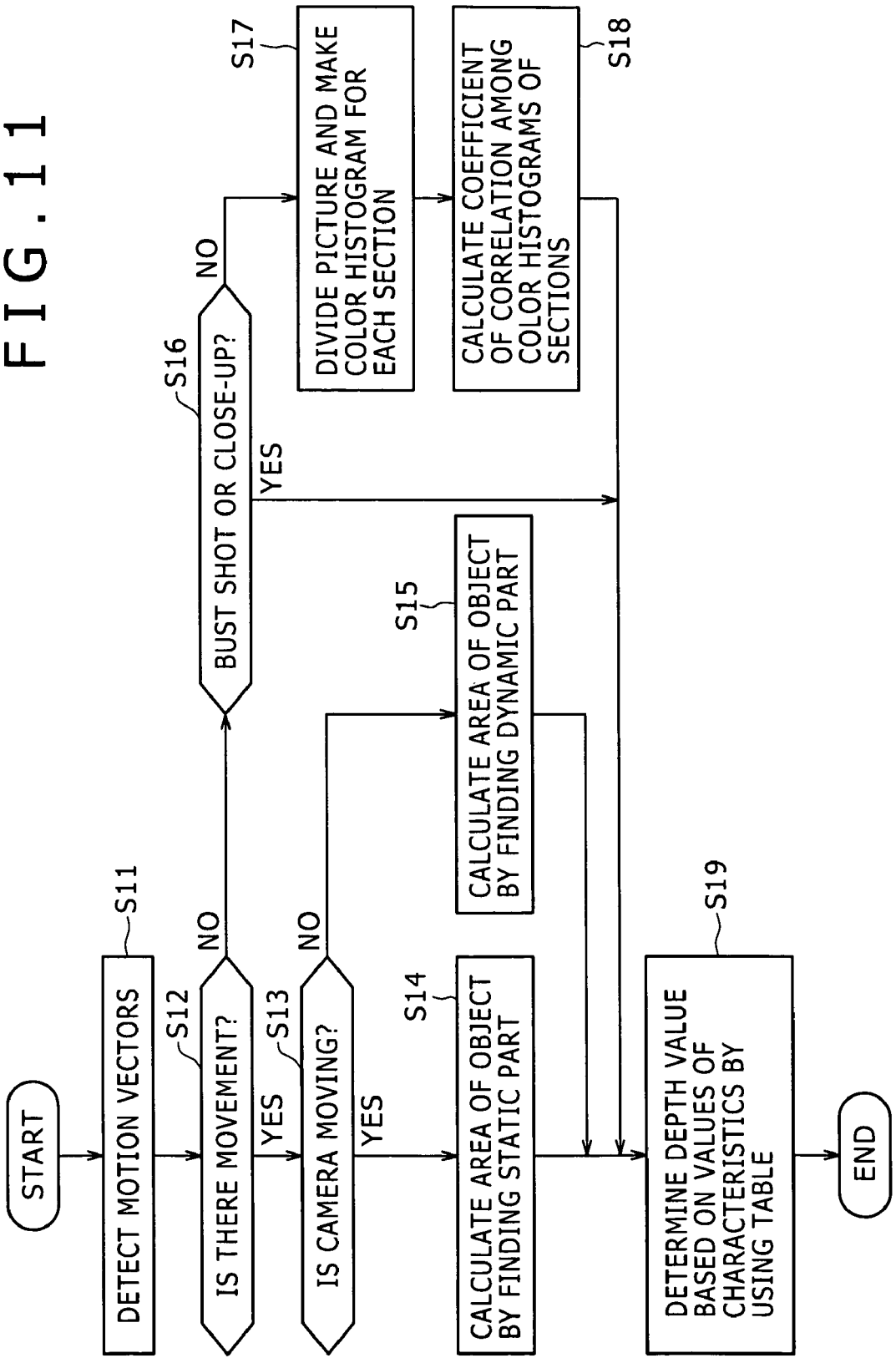
FIG. 11 is a flowchart showing the processing by the depth classifier.

By referring to the flowchart of FIG. 11, the processing by the depth classifiers 12 will be detailed below.

When picture signals V are supplied to the depth classifiers 12, they begin to process the picture signals V. In Step S11, the motion-vector detector 61 of the characteristics-extracting unit 12A of each depth classifier 12 detects motion vectors in macro-blocks. The macro-block is the unit for the detection of motion vectors.

In Step S11, the motion-vector detector 61 detects a different motion vector in the macro-block wherein the object exists from motion vectors in other macro-blocks if an object is moving in its background. On the other hand, if a picture of a certain field is taken and there is no movement in the picture, the motion-vector detector 61 detects motion vectors with values of zero in all the macro-blocks in the picture.

Figure 12A:
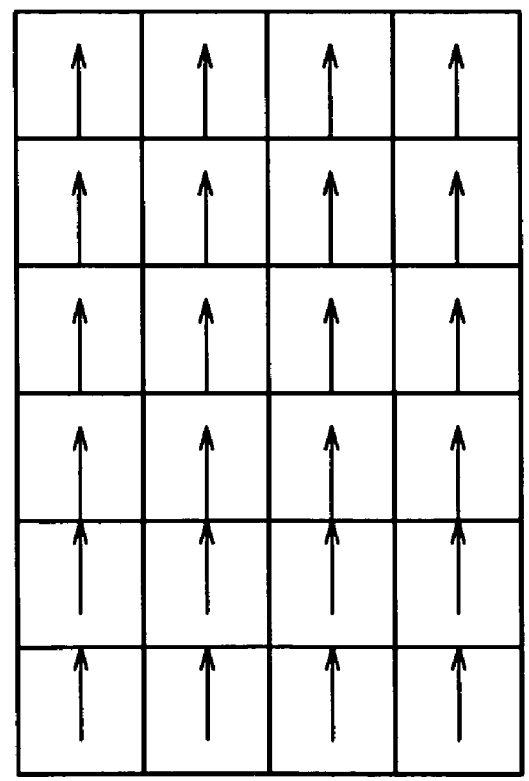
FIGS. 12A and 12B show motion vectors when a TV camera is being panned.
Figure 12B:
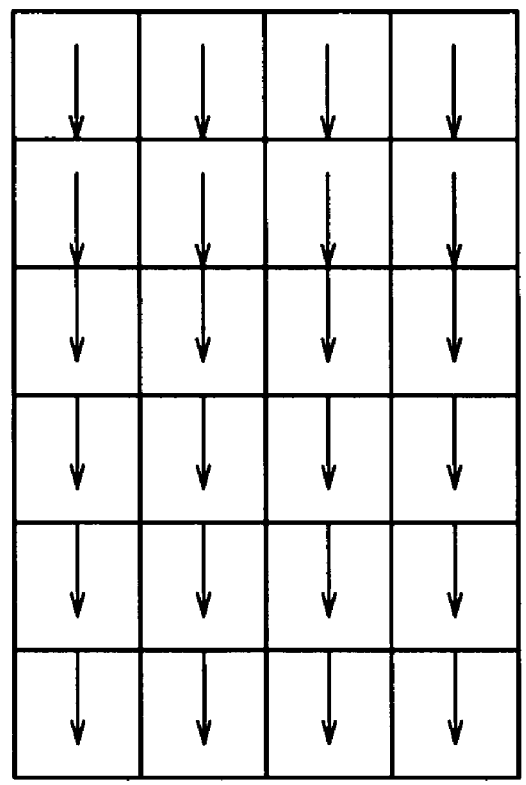
Figure 13B:
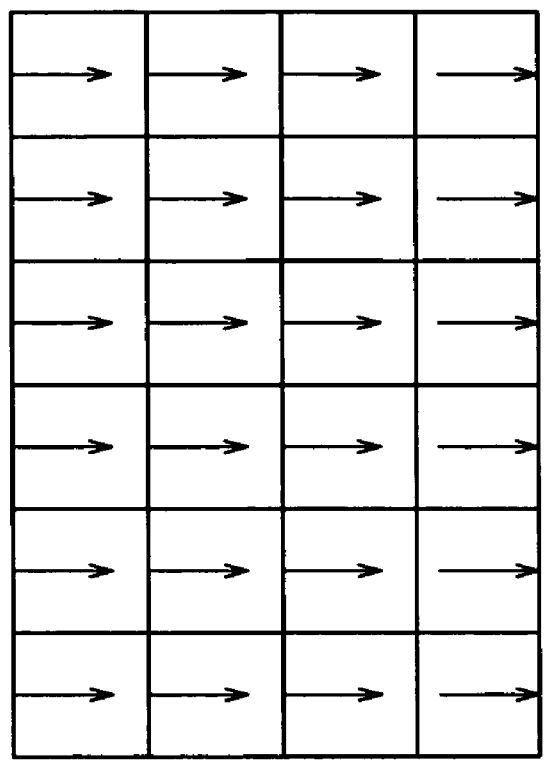
FIGS. 13A and 13B show motion vectors when the TV camera is being tilted.
Figure 13A:
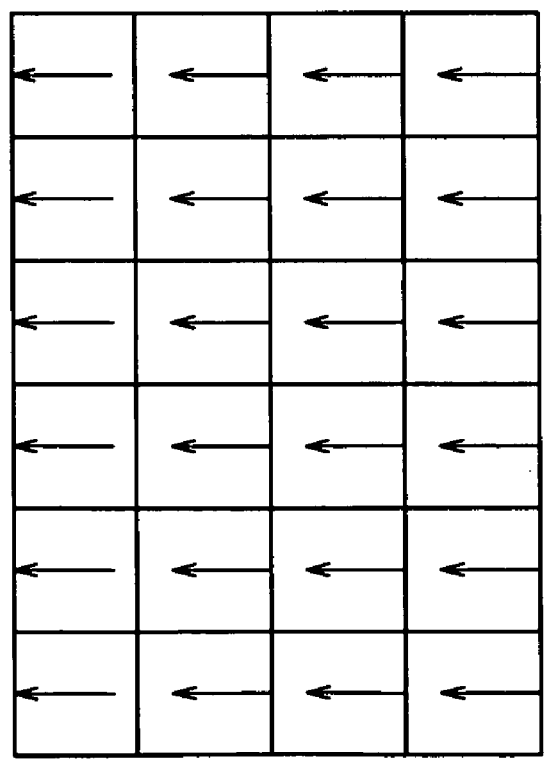

Further, in Step S11, if the TV camera is being panned, the motion-vector detector 61 detects the same motion vectors in accordance with the panning direction and velocity in all the macro-blocks as shown in FIGS. 12A and 12B. If the TV camera is being tilted, the motion-vector detector 61 detects the same motion vectors in accordance with the tilting direction and velocity in all the macro-blocks as shown in FIGS. 13A and 13B.

Figure 14:
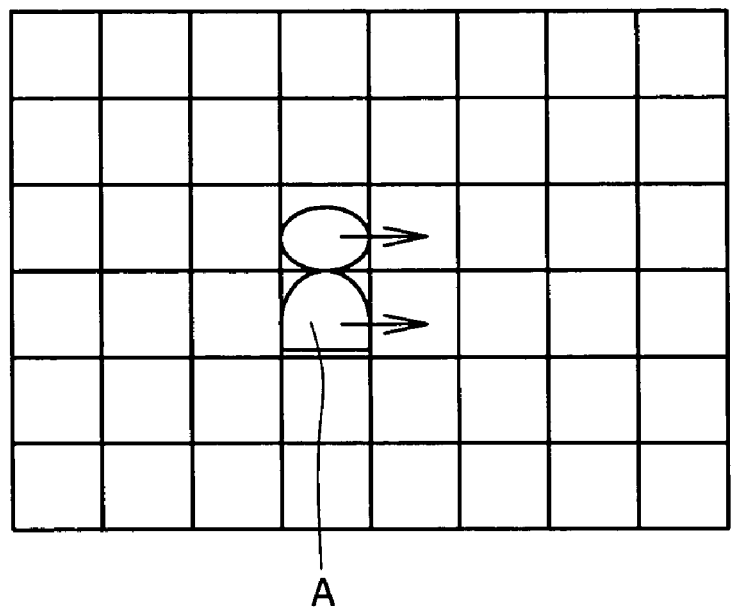
FIG. 14 shows motion vectors when an object is moving relative to the background not moving.
Figure 15:
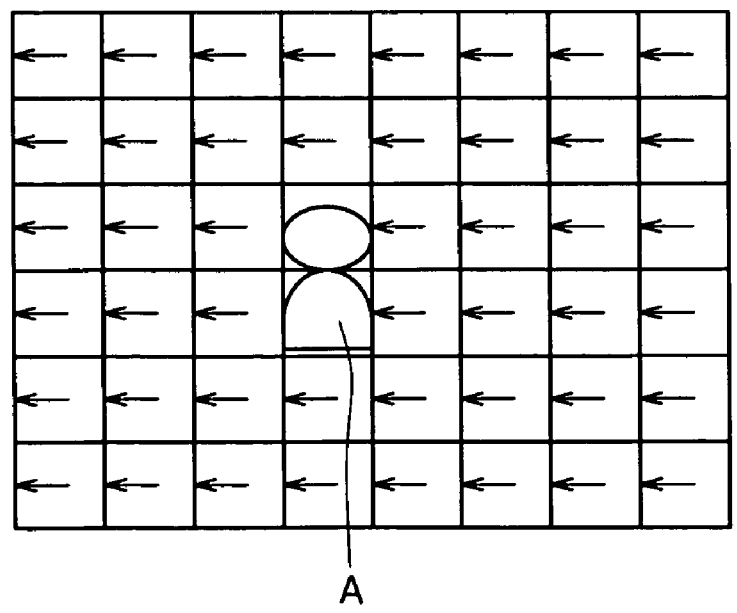
FIG. 15 shows motion vectors when the TV camera is following a moving object.

Also, in Step S11, if a picture of a certain field is taken and a person "A" is moving horizontally in the picture, the motion-vector detector 61 detects motion vectors in accordance with the movement of the person "A" in the macro-blocks wherein the person "A" exists and motion vectors with values of zero in all the macro-blocks constituting the background of the person "A," as shown in FIG. 14. If the camera is following a moving person "A" or the background of a person "A" not moving is moving, the motion-vector detector 61 detects the same motion vectors in all the macro-blocks constituting the background and motion vectors with values of zero in the macro-blocks wherein the person "A" exists, as shown in FIG. 15. In this way, macro-blocks of motion vectors different from motion vectors in the background macro-blocks can be regarded as macro-blocks bearing an object.

In Step S12, the movement finder 62 finds whether there is even one macro-block with a motion vector over a certain threshold value in the picture or not to determine whether there is movement in the picture or not.

If the movement finder 62 determines in Step S12 that there is movement in the picture, the processing advances to Step S13. In Step S13, the camera's movement finder 63 determines whether the camera is moving or not by determining the motion vectors of the macro-blocks constituting the background are of a certain threshold value or not. If the movement finder 62 determines in Step S12 that there is no movement in the picture, the processing advances to Step S16.

If the camera's movement finder 63 determines in Step S13 that the camera is moving, the processing advances to Step S14. In Step S14, the static-part finder 64 calculates the area of the object by calculating the number of macro-blocks with motion vectors of different values from the values of motion vectors of the background macro-blocks. Then, the processing advances to Step S19.

If the camera's movement finder 63 determines in Step S13 that the camera is not moving, the processing advances to Step S15. In Step S15, the dynamic-part finder 65 calculates the area of the object by calculating the number of the macro-blocks wherein movement is detected. Then, the processing advances to Step S19.

Figure 16:
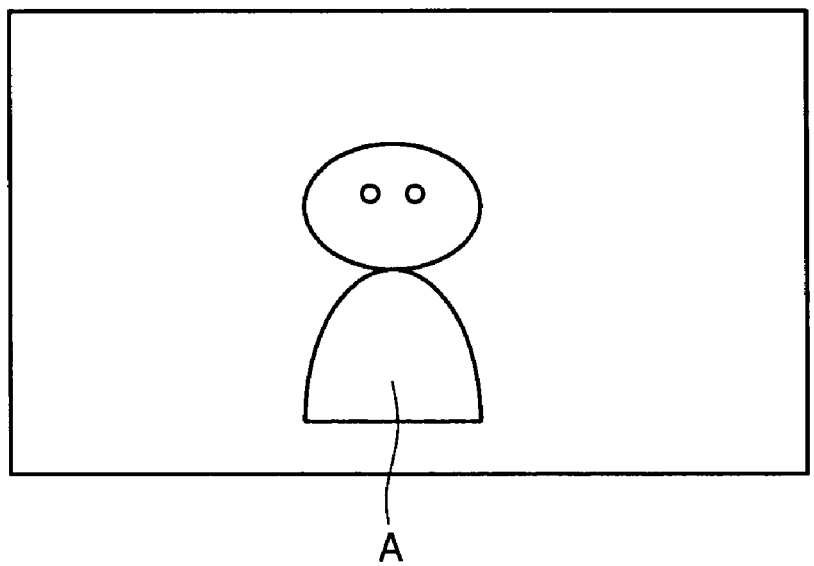
FIG. 16 is a plan view wherein an object is a bust shot.
Figure 17:
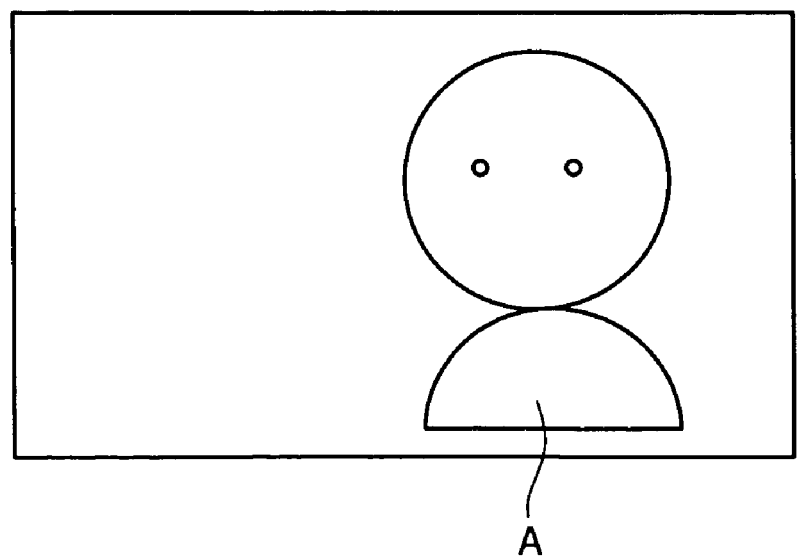
FIG. 17 is a plan view wherein an object is a close-up.

In Step S16, the bust shot/close-up finder 66 determines whether the person "A" is a bust shot as shown in FIG. 16 or not or whether the person "A" is a close-up as shown in FIG. 17 or not.

If the bust shot/close-up finder 66 determines in Step S16 that the picture of the person "A" is of a certain magnitude, the processing advances to Step S19. A bust shot and a close-up of a person can be regarded as pictures taken by a camera at a relatively short distance from the person. Accordingly, if the distance to the person "A" cannot be determined from the motion vectors, the bust shot/close-up finder 66 calculates the area of the face of the person "A" to determine whether the picture of the person "A" was taken by the camera at a relatively short distance from the person "A" or not.

If the bust shot/close-up finder 66 determines in Step S16 that the picture of the person "A" is not of a certain magnitude, the processing advances to Step S17. In Step S17, the color histogram developer 67 divides the picture under processing into equal sections and makes a color histogram for each section to grasp the distribution of colors in the picture. The color histogram developer 67 may divide the picture horizontally into three equal sections "L," "C," and "R" as shown in FIGS. 18A and 18B and make a color histogram for each section.

Figure 18A:
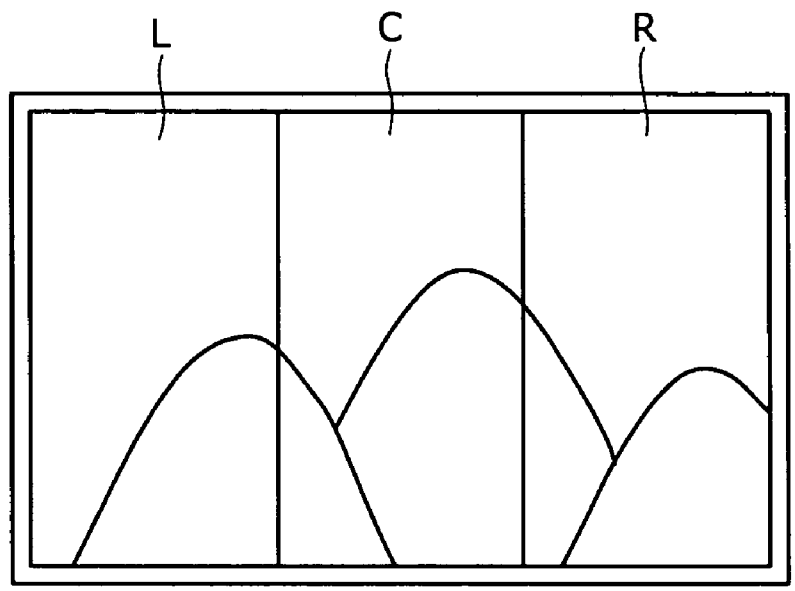
FIGS. 18A and 18B are plan views wherein the picture is divided into three equal sections.

If the picture is of a landscape as shown in FIG. 18A, the color distributions in the sections "L," "C," and "R" are almost the same and, hence, the color histograms of the sections are almost the same.

Figure 18B:
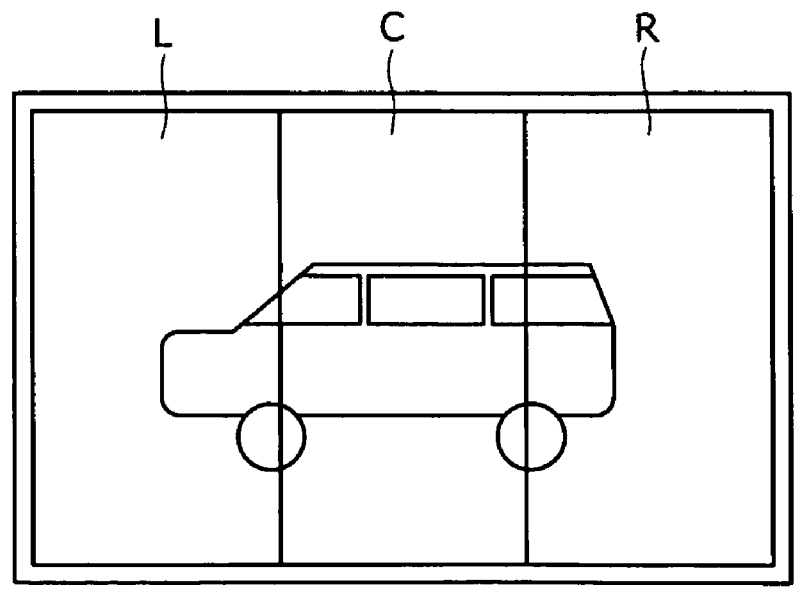

If the picture is of a certain object as shown in FIG. 18B, the color histograms of the sections "L," "C," and "R" are different from one another because the areas occupied by the object in the sections "L," "C," and "R" are different from one another. If the picture of the object has been taken by a camera at a long distance from the object, the object may go into the single section "C." In this case, the color histogram of the section "C" alone is influenced by the object. If the picture of the object has been taken by a camera at a short distance from the object, the object may extend over the three sections "L," "C," and "R." In this case, the color histograms of the three sections "L," "C," and "R" are influenced by the object.

Accordingly, it can be regarded that the larger the difference between the color histograms of sections "L," "C," and "R" is, the shorter the distance from the camera to the object is.

After the color histogram developer 67 makes the histograms of sections "L," "C," and "R," the processing S17 advances to Step S18. In Step S18, the correlation-coefficient calculator 68 calculates the coefficient of correlation among the color histograms of sections "L," "C," and "R" by finding the sum of absolute values of differences between (i) the frequencies of levels in the histogram of the section "C" and (ii) the frequencies of levels in the histograms of the sections "L" and "R." Then, the processing advances to Step S19.

For the calculation of the coefficient of correlation among the color histograms of sections "L," "C," and "R," the histogram of the center section "C" may be treated as the standard or the most peculiar histogram may be treated as the standard.

The characteristics-extracting unit 12A supplies, as values of characteristics, the area of the object found in Steps S14 and S15, the information on the bust shot and the close-up acquired in Step S16, the coefficient of correlation among the color histograms found in Step S18 to the depth-determining/classifying unit 12B.

In Step S19, the depth-determining/classifying unit 12B determines the depth of the picture by using (i) the values of characteristics supplied from the characteristics-extracting unit 12A and (ii) the depth-defining tables defining the depth of the object shown in FIG. 10. The distance from the camera to the object increases in the order of D1, D2, D3, . . . .

The depth-defining table of FIG. 10A defines the relation between the area of the object and its depth. If the characteristics-extracting unit 12A finds the area of an object based on motion vectors, the depth-determining/classifying unit 12B refers to this depth-defining table to determine the depth of the object. In this table, the area-depth relation is so defined that as the area becomes larger, the depth decreases.

The depth-defining table of FIG. 10B defines the depth of the object when the characteristics-extracting unit 12A determines that the picture is a bust shot or a close-up. Further, the depth-determining/classifying unit 12B refers to this depth-defining table to determine the depth of a particular picture.

The depth-defining table of FIG. 10C defines the relation between the coefficient of correlation among color histograms and the depth. When the characteristics-extracting unit 12A calculates the coefficient of correlation, the depth-determining/classifying unit 12B refers to this depth-defining table to determine the depth of the object.

In Step S19, the depth classifiers 12 supply the depth values determined by the depth-determining/classifying units 12B to the destination selector 13.

The destination selector 13 determines, based on the depth values, which picture is outputted to which display.

After receiving the depth values of pictures from the depth classifiers 12, the destination selector 13 sorts out the depth values. The depth increases in the order of D1, D2, D3, . . . , Dm. Pictures 1, 2, . . . , m are provided based on their depth values and the smaller the depth value of the picture is, the smaller the number of the picture becomes. The distance from the user to the display increases in the order of 141, 142, 143, . . . , 14n. The destination selector 13 stores the picture signals in the memory 15 and outputs the picture signals to the displays 14 sequentially. For example, the destination selector 13 outputs a picture signal with a depth value D1 to the display 14i.

As described above, the longer the distance to the object is, the deeper-side display the display system 10 of the first embodiment shows a picture on. Therefore, the user can perceive the changing distance to the object from the change of focal distance and three-dimensional view through his or her both eyes when watching a program. Thus, unlike the related art, the display system 10 can provide the enhancement of our feelings as if we were in real scenes when we watch programs provided on TV etc.

The display system 10 classifies picture signals based on the depth values of the pictures, detects motion vectors in the picture of a picture signal, and detects the area of the object according to motion vectors whose values are different from those of motion vectors of the background. Therefore, the characteristics caused by the change in the picture in the time-line direction can be detected. Further, when the characteristics cannot be detected by the motion vectors, a face portion is detected according to the shape of a skin-color portion. Based on an area of the face portion, it is possible to detect the color characteristics indicating that the distance to the object is equal to or less than a prescribed distance. Further, when such a face portion is smaller than a prescribed value, it is possible to detect the color characteristics by dividing the picture into a plurality of sections to grasp the distribution of colors in the picture and by the coefficient of correlation showing levels of differences in the color distribution.

In a second embodiment according to the present invention, there is provided a display system in which one picture source 111 supplies one picture signal V1 to a depth classifier 121.

FIG. 19 shows a configuration of the display system according to the second embodiment. Also, since the configuration of the display system of the second embodiment is partially identical to that of the display system 10 of FIG. 1, like parts are given like reference letters and numerals and detailed description thereof will be omitted.

In the display system 20, when one picture source 111 supplies one picture signal V1 to the depth classifier 121, by using the depth-defining table of FIG. 10, the depth classifier 121 estimates the depth values of pictures based on the values of characteristics of the pictures, and divides the series of pictures into pictures with time domains based on their depth values. The memory 15 includes memory areas 151, 152, 153, . . . for respectively storing the series of pictures divided into pictures based on their depth values. The destination selector 13 sequentially takes out the series of pictures of respective depth values stored in the memory areas 151, 152, 153, . . . , and shows pictures on displays corresponding to their depth values, respectively.

Thus, the display system 20 of the second embodiment can show a plurality of pictures from one picture signal on the displays corresponding to their depth values, respectively.

As shown in FIG. 20, for example, the display system 20 shows one inputted picture x on a display corresponding to its depth value. At the same time, it takes out another pictures y and z with depth values which are different from the depth value of the inputted picture x from the memory 15, and shows them on respective displays corresponding to their depth values. Therefore, the user can watch a program while perceiving the changing distance to the object according to the depth values.

Further, according to a third embodiment of the present invention, there is provided a display system having a picture converting unit in place of the depth classifier 12 of the display system 10 of the above first embodiment.

FIG. 21 shows a configuration of the display system according to the third embodiment. Also, since the configuration of the display system of the third embodiment is partially identical to that of the display system 10 of FIG. 1, like parts are given like reference letters and numerals and detailed description thereof will be omitted.

In the display system 30, when a picture source 111 supplies a picture signal V1 to a picture converting unit 32, the picture converting unit 32 converts the picture signal V1 into a plurality of pictures with different depth values. The destination selector 13 chooses a display 14 (display 141, 142, . . . , 14n) to which a picture is outputted according to the depth value of the picture.

FIG. 22 shows a block diagram of the picture converting unit 32. The depth classifier 12 estimates a depth value according to the inputted picture signal V1 and stores a picture together with the depth value in the memory 33. The picture extracting unit 34 takes out only the required number of pictures, to be outputted, with the depth values different from that of the inputted picture from the memory 33. Namely, if the inputted picture is a near scene, the picture extracting unit 34 takes out a picture of a far scene from the memory 33. Alternatively, when the inputted picture is a far scene, it takes out a picture of a near scene from the memory 33.

Figure 23:
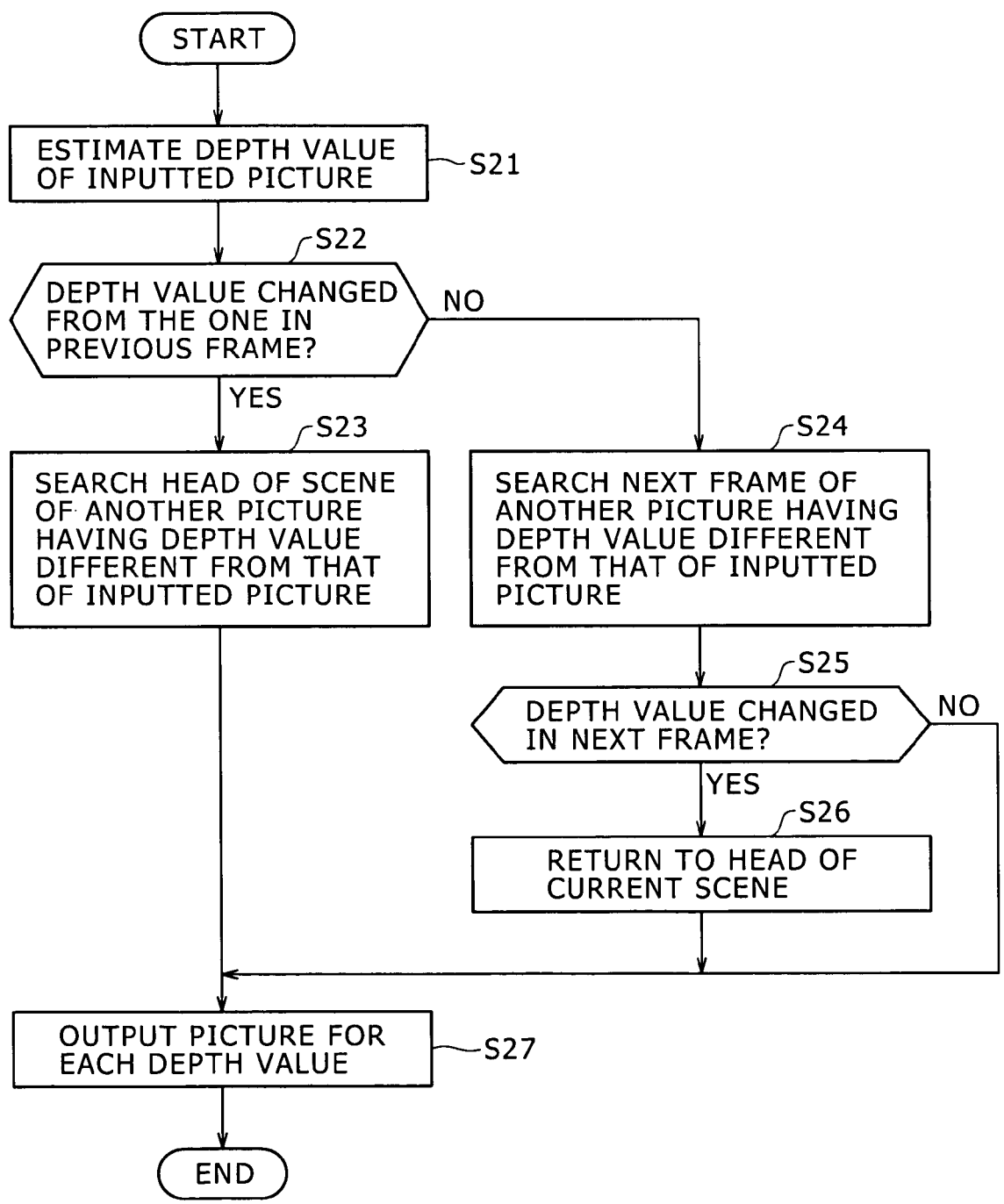
FIG. 23 is a flowchart showing the processing by a picture extracting unit.

By referring to the flowchart of FIG. 23, the processing by the picture extracting unit 34 will be detailed below.

When the picture extracting unit 34 begins to extract a picture, in Step S21, it estimates a depth value of the inputted picture.

Then, in Step S22, the picture extracting unit 34 determines whether or not the depth value has changed from the one in the previous frame.

Figure 24A:
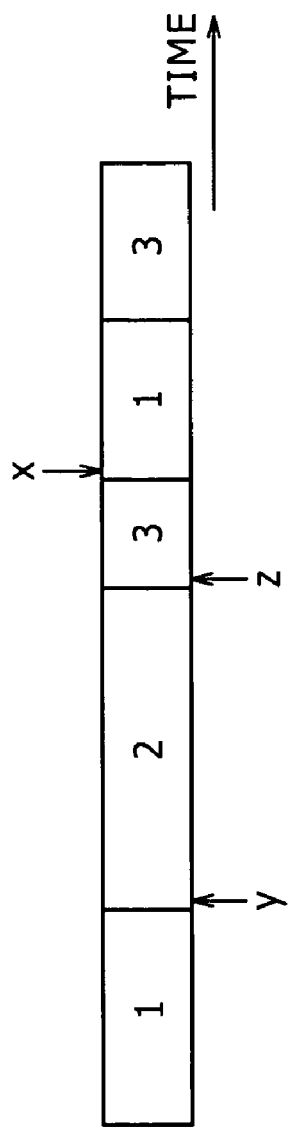
FIGS. 24A, 24B, and 24C show how to extract outputted pictures.

When the picture extracting unit 34 determines in Step S22 that the depth value in the current frame has changed from the one in the previous frame, the processing advances to Step S23. In Step S23, as shown in FIG. 24A, the picture extracting unit 34 searches the heads of scenes of another pictures y and z having labels 2 and 3, respectively, of depth values being different from that of the label 1 of the inputted picture x, and outputs pictures based on their depth values. Then, the processing by the picture extracting unit 34 advances to Step S27.

Figure 24B:
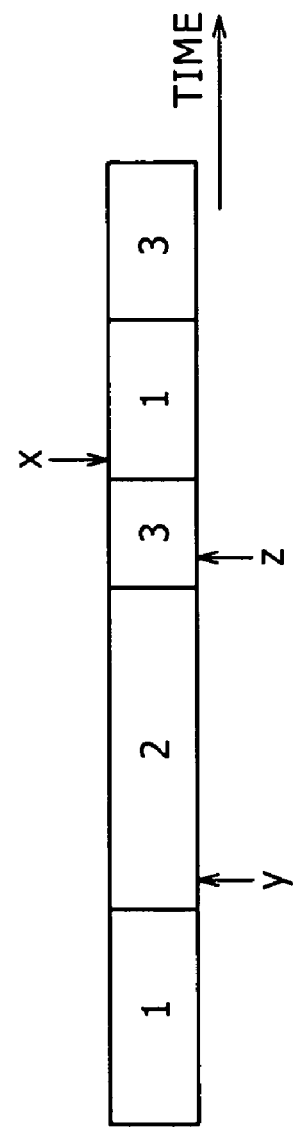

On the other hand, when the picture extracting unit 34 determines in Step S22 that the depth value in the current frame has not changed from the one in the previous frame, the processing advances to Step S24 and, as shown in FIG. 24B, with respect to another pictures y and z, the picture extracting unit 34 searches respective next frames. After that, the processing by the picture extracting unit 34 advances to Step S25.

In Step S25, the picture extracting unit 34 determines whether or not the depth value has changed in the next frames of another pictures y and z.

Figure 24C:
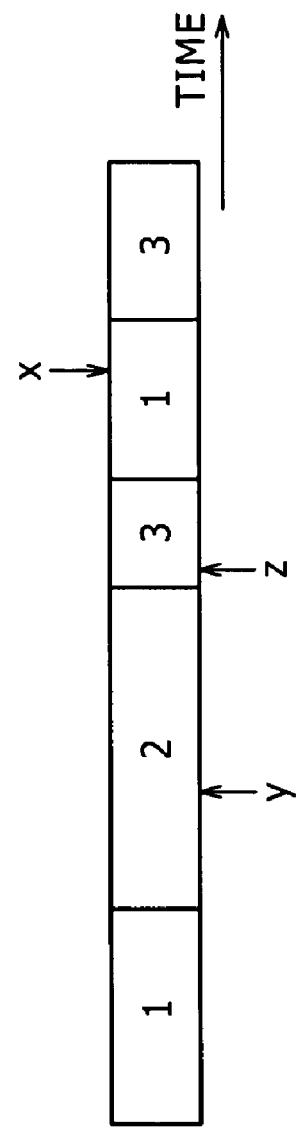

In Step S25, as shown in FIG. 24C, for example, in the next frame of another picture z, when the depth value changes because a scene of another picture is shorter than a scene of the inputted picture x, the processing advances to Step S26. Then, the processing by the picture extracting unit 34 returns to the head of the current scene in another picture z. After that, the processing by the picture extracting unit 34 advances to Step S27.

On the other hand, when it is determined in Step S25 that the depth values have not changed in the next frames of another pictures y and z, the processing by the picture extracting unit 34 advances to Step S27.

In Step S27, the picture extracting unit 34 outputs a picture for each depth value and ends the picture extracting process.

Thus, in the display system 30 of the third embodiment, it becomes possible to selectively show a plurality of pictures which are different in terms of time series on the displays 14 based on the depth values in such a way that when, for example, the inputted picture is a near scene, another picture of a far scene is taken out from the memory 33 and when the inputted picture is a far scene, another picture of a near scene is taken out from the memory 33.

Figure 25:
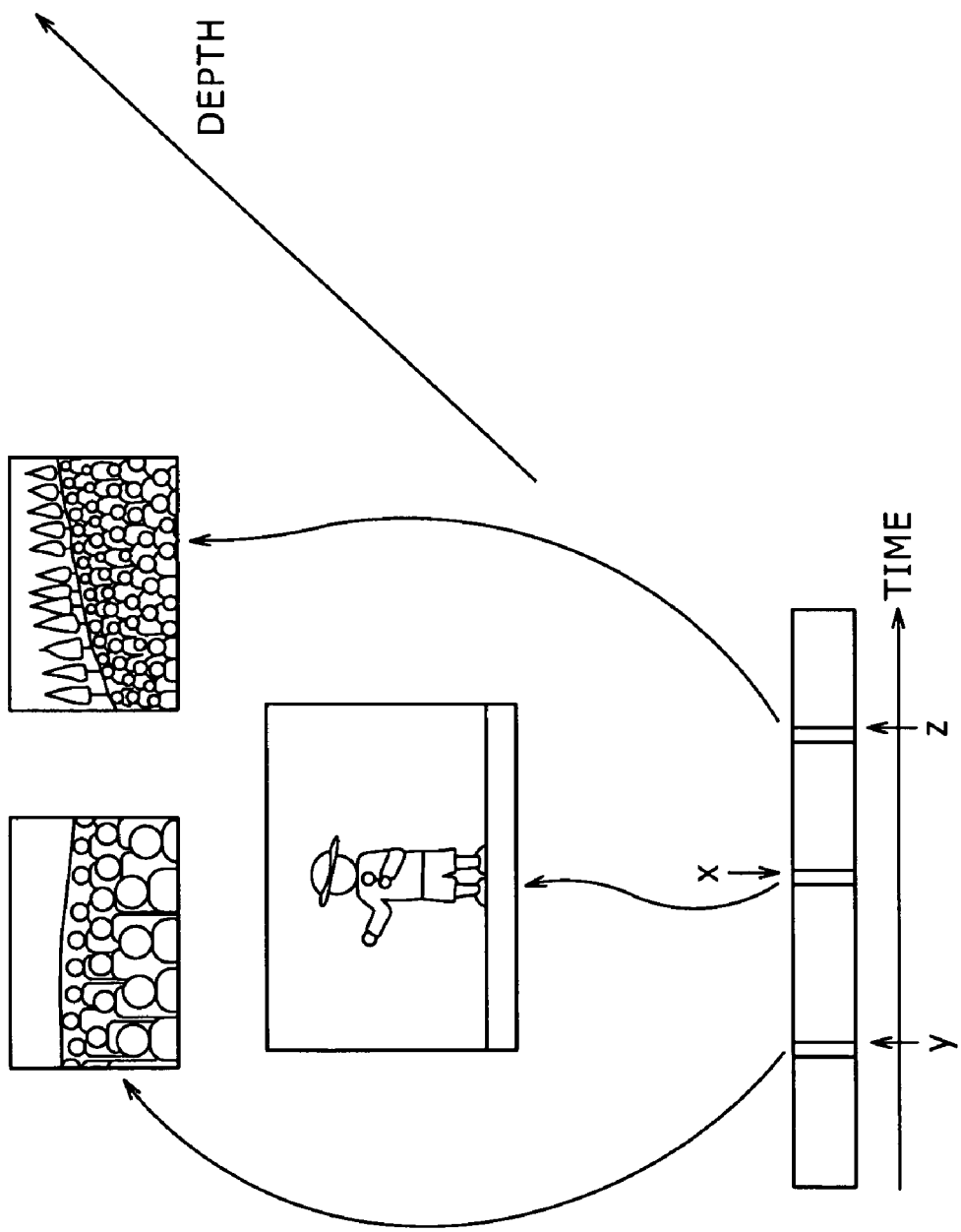
FIG. 25 shows an example wherein an inputted picture and pictures whose positions are different from that of the inputted picture in a time sequence are reproduced.

For example, as shown in FIG. 25, the inputted picture x of the nearest scene and another pictures y and z, whose depth values are different, are taken out from the memory 33 and are shown in respective displays based on the depth values. Therefore, the user can watch a program while perceiving the changing distance to the object according to the depth value.

Further, according to a fourth embodiment of the present invention, there is provided a display system having a moving control unit in place of the destination selector 13 of the above first embodiment.

In the display system of the fourth embodiment, as shown in FIG. 26, displays 14a and 14b are provided with moving mechanisms 25 such as wheels. The displays 14a and 14b are moved back and forth in the depth direction with respect to the user in accordance with the depth values of the pictures to be shown.

FIG. 27 shows a configuration of the display system according to the forth embodiment. Also, since the configuration of the displays system of the forth embodiment is partially identical to that of the display system 10 of FIG. 1, like parts are given like reference letters and numerals and detailed description thereof will be omitted.

As shown in FIG. 27, in the display system 40, each depth classifier 12 (depth classifier 121, 122, . . . , 12m) supplies a depth value to following each moving control unit 44 (moving control unit 441, 442, . . . , 44m). Then, based on the depth value, the moving control unit 44 moves displays forward, for example, when the depth value is small, and moves displays backward when the depth value is large. Thus, the moving control unit 44 moves displays 141, 142, . . . , 14n showing respective pictures back and forth relative to the user such that the depth value and the distance between the user and the display 14 correspond to each other.

For example, as shown in FIG. 28, when the displays 141, 142, 143 show pictures of three different games of sports, the depth classifier 12 classifies the pictures of the three games based on their depth values. When the moving control unit 44 moves each display showing a picture of each game to a position corresponding to the depth value, the user can watch pictures of the three games at the same time while feeling the depth and impressiveness.

Further, the present invention is not limited to the embodiments described above. It is need less to say that various modifications can be made without departing from the spirit of the present invention.

In the above embodiment, a series of processing programs are preinstalled in the system. However, instead of providing the program by pre-installation, the program may be provided through networks such as the Internet by means of downloading. Alternatively, the program may be provided through various storage media. Storage media which can be used for this purpose are optical discs such as CD-ROMs and DVDs, magnetic discs such as floppy (registered trademark) discs, removable hard disk drives which are integrally formed with their drive mechanisms, memory cards, and so on.

In the above embodiment, the display unit having combined function blocks shows each picture on a display. However, the above display system may be provided inside the display.

The present invention can be applied, for example, to viewing a program wherein a far scene and a near scene are switched.

It should be understood by those skilled in the art that various modifications, combinations, sub-combinations and alterations may occur depending on design requirements and other factors insofar as they are within the scope of the appended claims or the equivalents thereof.

What is claimed is:

1. A display unit displaying pictures of at least one picture signal on a plurality of displays arranged at different distances from a user, the display unit comprising:

classifying means for classifying the images based on depth value of the pictures, wherein depth values are calculated based on (i) values of extracted motion characteristics and (ii) depth-defining tables; and display means for choosing a plurality of the displays based on the classification of the picture signals according to their depth values and displaying the pictures in the form of moving pictures on the chosen displays, wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object.

2. A display unit according to claim 1, wherein, with respect to the pictures of one picture signal divided into pictures with time domains based on the classification by the classifying means, the displaying means repeatedly reproduces one of the pictures with a time domain different from the time domain of the input picture.

3. A display unit according to claim 1, wherein the displaying means compares the depth values of the pictures of the plurality of picture signals classified by the classifying means and chooses the displays on which the pictures are to be shown based on the result of the comparison.

4. A display unit according to claim 1, wherein the classifying means classifies a plurality of picture signals based on the depth values detected in accordance with the area of the object in the picture.

5. A display unit according to claim 1, wherein the classifying means classifies a plurality of picture signals based on depth values detected in accordance with the distribution of colors in the picture.

6. A display method for displaying pictures of at least one picture signal on a plurality of displays arranged at different distances from a user, the display method comprising the steps of:

classifying the picture signals based on depth value of the pictures, wherein depth values are calculated based on (i) values of extracted motion characteristics and (ii) depth-defining tables, wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object; and choosing a plurality of the displays based on the classification by the classifying means and displaying the pictures in the form of moving pictures on the chosen displays.

7. A non-transitory computer readable medium encoded with a set of computer program instructions that when executed, caused a computer to display picture signals on a plurality of displays, the computer program instructions comprising:

classifying the picture signals based on depth value of the pictures, wherein depth values are calculated based on (i) values of extracted motion characteristics and (ii) depth-defining tables, wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object; and choosing a plurality of the displays based on the classification by the classifying means and displaying the pictures in the form of moving pictures on the chosen displays.

8. A non-transitory computer readable storage medium holding a program for a display method by which pictures of picture signals are displayed on a plurality of displays by having arithmetic processing means carry out a prescribed process, the prescribed process comprising the steps of:

classifying the picture signals based on depth value of the pictures, wherein depth values are calculated based on (i) values of extracted motion characteristics and (ii) depth-defining tables, wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object; and choosing a plurality of the displays based on the classification by the classifying means and displaying the pictures in the form of moving pictures on the chosen displays.

9. A display unit displaying pictures of at least one picture signal on a plurality of displays, the display unit comprising:

classifying means for classifying the images based on depth value of the pictures, wherein depth values are calculated based on (i) values of extracted motion characteristics and (ii) depth-defining tables;

wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object; and moving control means for displaying the pictures of the picture signals classified by the classifying means on a plurality of the displays and moving the displays to positions at different distances in accordance with the depth values of the pictures.

10. A display method for displaying pictures of at least one picture signal on a plurality of displays, the display method comprising the steps of:

classifying the picture signals based on depth value of the pictures, wherein depth values are calculated based on (i) values of extracted motion characteristics and (ii) depth-defining tables, wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object; and displaying the pictures of the picture signals classified by the classifying means on a plurality of the displays and moving the displays to positions at different distances in accordance with the depth values of the pictures.

11. A non-transitory computer readable medium encoded with a set of computer program instructions that when executed, causes a computer to display picture signals on a plurality of displays, the computer programs instructions comprising:

classifying the picture signals based on depth value of the pictures, wherein depth values are calculated based on (i) values of extracted motion characteristics and (ii) depth-defining tables, wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object; and displaying the pictures of the picture signals classified by the classifying means on a plurality of the displays and moving the displays to positions at different distances in accordance with the depth values of the pictures.

12. A non-transitory computer readable storage medium holding a program for a display method by which pictures of picture signals are displayed on a plurality of displays by having arithmetic processing means carry out a prescribed process, the prescribed process comprising the steps of:

classifying the picture signals based on depth value of the pictures, wherein depth values are calculated based on (i) values of extracted motion characteristics and (ii) depth-defining tables, wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object; and displaying the pictures of the picture signals classified by the classifying means on a plurality of the displays and moving the displays to positions at different distances in accordance with the depth values of the pictures.

13. A display unit displaying pictures of at least one picture signal on a plurality of displays arranged at different distances from a user, the display unit comprising:

classifying section for classifying the images based on depth value of the pictures, wherein depth values are calculated based on (i) values of extracted motion characteristics and (ii) depth-defining tables, wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object; and displaying section choosing a plurality of the displays based on the classification by the classifying section and displaying the pictures in the form of moving pictures on the chosen displays.

14. A display unit displaying pictures of at least one picture signal on a plurality of displays arranged at different distances from a user, the display unit comprising:

classifying section for classifying the images based on depth value of the pictures, wherein depth values are calculated based on (i) values of extracted motion characteristics and (ii) depth-defining tables, wherein, a first table defines a relationship between an area of an object and a depth of the object, and wherein, if an area of an object is found, the depth is calculated by referring to the at least one table defining the relationship between the area of an object and the depth of the object, wherein a second table defines the depth of the object when determined that a picture is a bust shot or a close-up and is referred to, to determine the depth of a particular picture, and wherein a third table defines the relation between a coefficient of correlation among color histograms and a depth, and is referred to when the coefficient of correlation is calculated, and determines the depth of the object; and moving control section displaying the pictures of the picture signals classified by the classifying section on a plurality of the displays and moving the displays to positions at different distances in accordance with the depth values of the pictures.

\* \* \* \* \*